US012774368B2

(12) United States Patent
Yajima et al.

(10) Patent No.: US 12,774,368 B2
(45) Date of Patent: Oct. 27, 2026

(54) POLYIMIDE COMPOUND

(71) Applicant: OCHANOMIZU UNIVERSITY, Tokyo (JP)

(72) Inventors: Tomoko Yajima, Tokyo (JP); Tadashi Kanbara, Tokyo (JP)

(73) Assignee: OCHANOMIZU UNIVERSITY, Tokyo (JP)

( * ) Notice: Subject to any disclaimer, the term of this patent is extended or adjusted under 35 U.S.C. 154(b) by 586 days.

(21) Appl. No.: 18/276,123

(22) PCT Filed: Feb. 7, 2022

(86) PCT No.: PCT/JP2022/004744
§ 371 (c)(1),
(2) Date: Aug. 7, 2023

(87) PCT Pub. No.: WO2022/168979
PCT Pub. Date: Aug. 11, 2022

(65) Prior Publication Data

US 2024/0132669 A1 Apr. 25, 2024

(30) Foreign Application Priority Data

Feb. 8, 2021 (JP) ................................ 2021-018385

(51) Int. Cl.
*C08G 73/14* (2006.01)

(52) U.S. Cl.
CPC .................................... *C08G 73/14* (2013.01)

(58) Field of Classification Search
None
See application file for complete search history.

(56) References Cited

U.S. PATENT DOCUMENTS

| | | | | | |
|---|---|---|---|---|---|
| 3,832,322 | A | * | 8/1974 | Critchley | C08G 73/1067 524/610 |
| 2023/0094470 | A1 | | 3/2023 | Oishi et al. | |
| 2023/0099704 | A1 | | 3/2023 | Oishi et al. | |

FOREIGN PATENT DOCUMENTS

| | | | | |
|---|---|---|---|---|
| EP | 3031848 | A1 | | 6/2016 |
| JP | 2-208324 | | * | 8/1990 |
| JP | H02208324 | A | * | 8/1990 |
| JP | 2851019 | | * | 11/1998 |
| JP | 2020-203981 | A | | 12/2020 |
| WO | 2021/230254 | A1 | | 11/2021 |
| WO | 2021/230255 | A1 | | 11/2021 |

OTHER PUBLICATIONS

Office Action issued in corresponding Japanese Patent Application No. 2022-579644, dated Dec. 2, 2025.
Barata-Vallejo et al., "Benign Perfluoroalkylation of Aniline Derivatives through Photoredox Organocatalysis under Visible-Light Irradiation," European Journal of Organic Chemistry, 36: 7869-7875 (2015).
International Search Report issued in corresponding International Patent Application No. PCT/JP2022/004744 dated Apr. 19, 2022.
International Preliminary Report on Patentability and Written Opinion issued in corresponding International Patent Application No. PCT/JP2022/004744 dated Aug. 17, 2023.

* cited by examiner

*Primary Examiner* — Tae H Yoon
(74) *Attorney, Agent, or Firm* — Morgan, Lewis & Bockius LLP

(57) ABSTRACT

The present invention provides a polyimide compound represented by formula (I): wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^2$ is an aliphatic or aromatic bisimide-N',N-diyl, and n1 is any integer.

$$-\!\!\left(Ar^1-A^1-Ar^2-A^2\right)_{n1}\!\!-$$

17 Claims, No Drawings

POLYIMIDE COMPOUND

TECHNICAL FIELD

The present disclosure relates to a polyimide compound and a monomer as the starting material and a precursor thereof.

BACKGROUND ART

Polyimides has excellent in the properties including the heat resistance, the mechanical properties, and the insulating properties. Accordingly, polyimides are widely used in various applications, and, for example, used for automobile components, aircraft components, and electrical and electronic components (for example, Patent Literature 1).

CITATION LIST

Patent Literature

Patent Literature 1: Japanese Patent Laid-Open No. 2020-203981

SUMMARY OF INVENTION

Technical Problem

Since polyimides are widely used in various applications, there are needs for polyimides having various structures.

Solution to Problem

The present disclosure includes the following aspects.

[1] A polyimide compound represented by formula (I):

$$-\!\left(Ar^1-A^1-Ar^2-A^2\right)_{n1}\!-$$

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^2$ is an aliphatic or aromatic bisimide-N',N-diyl, and n1 is any integer.

[2] The polyimide compound according to [1], wherein $Ar^1$ and $Ar^2$ are each a phenylene group substituted with one or more substituents each selected from a $C_{1-6}$ alkyl group, a $C_{1-6}$ alkoxy group, and a halogen atom.

[3] The polyimide compound according to [1] or [2], wherein formula (I) is formula (Ia'):

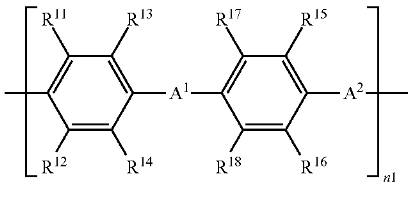

wherein $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^2$ is an aliphatic or aromatic bisimide-N',N-diyl, and n1 is any integer.

[4] The polyimide compound according to [3], wherein $R^{11}$ and $R^{12}$ are each a $C_{1-6}$ alkyl group, a $C_{1-6}$ alkoxy group, or a halogen atom, $R^{15}$ and $R^{16}$ are each a $C_{1-6}$ alkyl group, a $C_{1-6}$ alkoxy group, or a halogen atom, and $R^{13}$, $R^{14}$, $R^{17}$, and $R^{18}$ are each a hydrogen atom.

[5] The polyimide compound according to [1], wherein $Ar^1$ and $Ar^2$ are each an indolylene group optionally substituted with one or more substituents each selected from a $C_{1-6}$ alkyl group, a $C_{1-6}$ alkoxy group, and a halogen atom.

[6] The polyimide compound according to any one of [1] to [5], wherein formula (I) is formula (Ic):

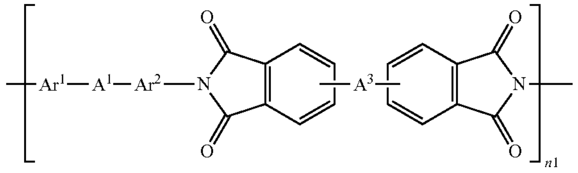

wherein $Ar^1$ is a phenylene group substituted with one or more substituents each selected from a $C_{1-6}$ alkyl group, a $C_{1-6}$ alkoxy group, and a halogen atom, or an indolylene group optionally substituted with one or more substituents, $Ar^2$ is a phenylene group substituted with one or more substituents each selected from a $C_{1-6}$ alkyl group, a $C_{1-6}$ alkoxy group, and a halogen atom, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^3$ is a single bond or a divalent organic group, and n1 is any integer.

[7] The polyimide compound according to [6], wherein $A^3$ is a single bond, a linear or branched $C_{1-16}$ alkylene group optionally substituted with a fluorine atom, an oxygen atom, —CO—, —C≡C, —$SO_2$—,

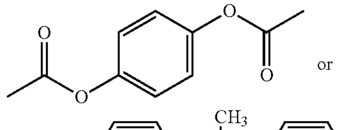

or

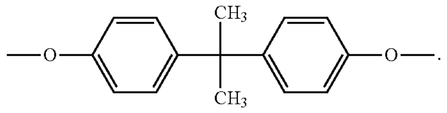

[8] The polyimide compound according to any one of [1] to [5], wherein $A^2$ is any one of the following groups:

-continued
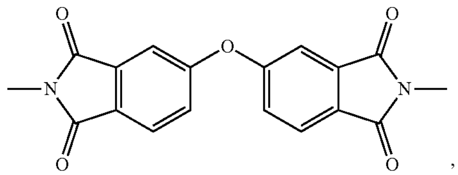
,
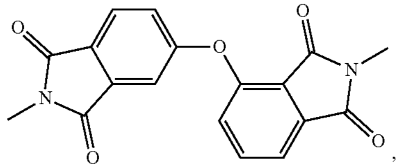
,
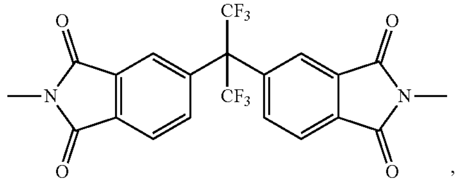
,
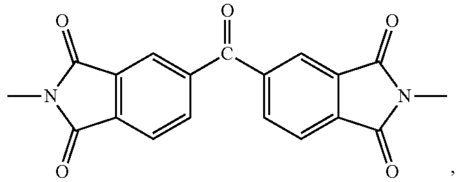
,
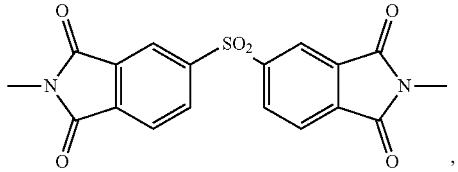
,
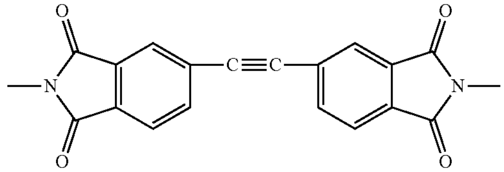
,
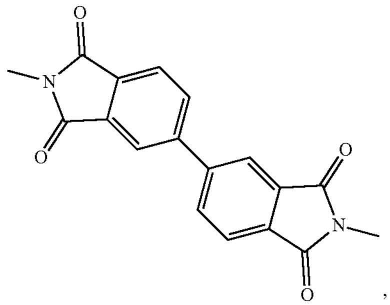
,
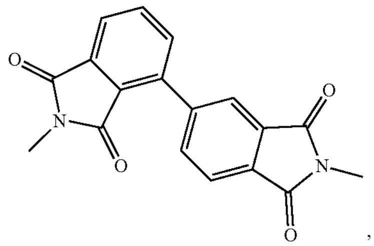
,
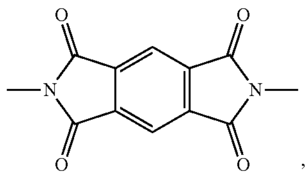
,
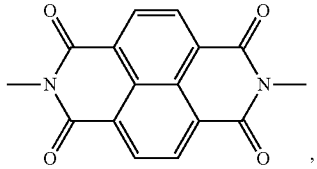
,
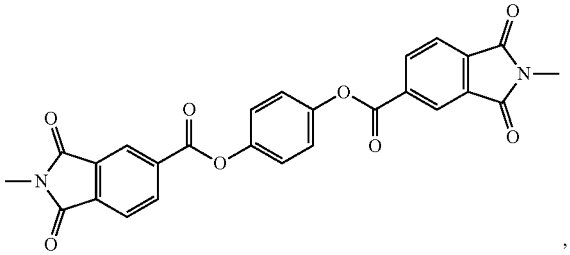
,
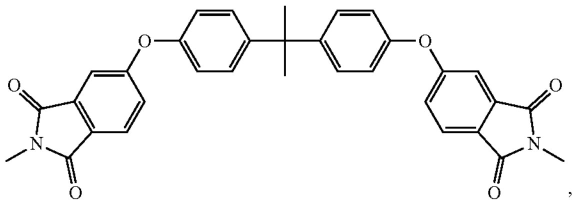
,
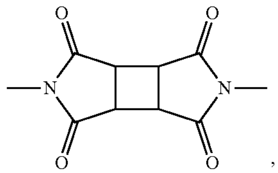
,
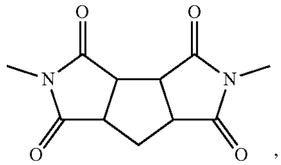
,
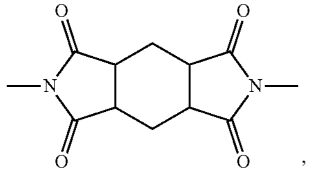
,
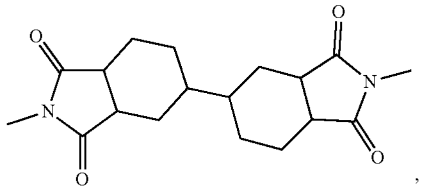
,
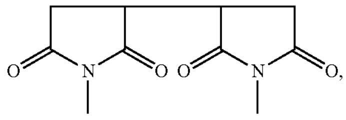
, -continued

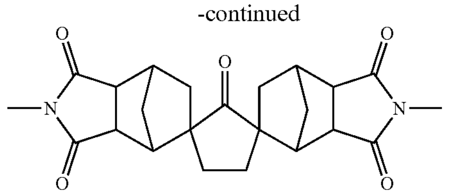

or

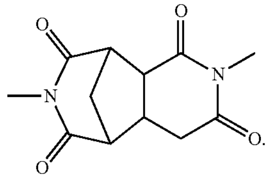

[9] The polyimide compound according to [1], wherein formula (I) is formula (Id):

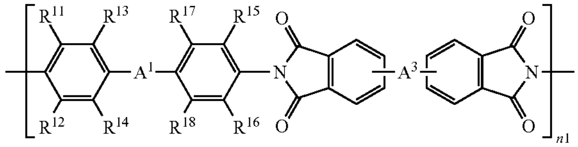

wherein $R^{11}$, $R^{12}$, $R^{13}$, $R^{14}$, $R^{15}$, $R^{16}$, $R^{17}$, and $R^{18}$ are each independently a hydrogen atom, a $C_{1-6}$ alkyl group, a $C_{1-6}$ alkoxy group, or a halogen atom, with a proviso that at least one of $R^{11}$, $R^{12}$, $R^{13}$, and $R^{14}$ is a $C_{1-6}$ alkyl group, a $C_{1-6}$ alkoxy group, or a halogen atom, and with a proviso that at least one of $R^{11}$, $R^{12}$, $R^{15}$, and $R^{16}$ is a $C_{1-6}$ alkyl group, a $C_{1-6}$ alkoxy group, or a halogen atom, $A^1$ is a linear or branched $C_{4-16}$ perfluoroalkylene group, $A^3$ is a single bond or a divalent organic group, and n1 is any integer.

[10] A compound represented by formula (II):

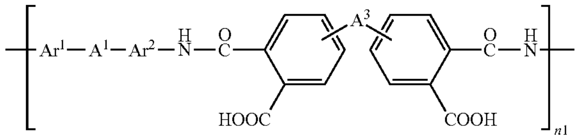

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^3$ is a divalent organic group, and n1 is any integer.

[11] A polyimide compound represented by formula (III):

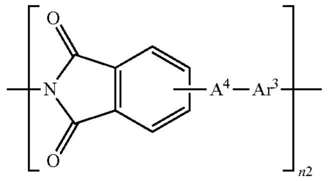

wherein $Ar^3$ is an optionally substituted phenylene group or indolylene group, $A^4$ is a linear or branched $C_{4-16}$ perfluoroalkylene group, and n2 is any integer.

[12] The polyimide compound according to [11], wherein formula (III) is formula (IIIa):

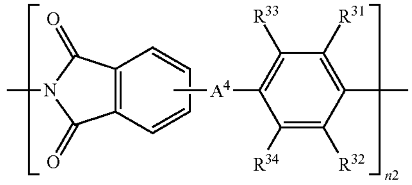

wherein $R^{31}$, $R^{32}$, $R^{33}$, and $R^{34}$ are each independently a hydrogen atom, a $C_{1-6}$ alkyl group, a $C_{1-6}$ alkoxy group, or a halogen atom, $A^4$ is a linear or branched $C_{4-16}$ perfluoroalkylene group, and n2 is any integer.

[13] The polyimide compound according to [12], wherein $R^{31}$ and $R^{32}$ are each independently a $C_{1-6}$ alkyl group, a $C_{1-6}$ alkoxy group, or a halogen atom, and $R^{33}$ and $R^{34}$ are each a hydrogen atom.

[14] The polyimide compound according to or [13], wherein $R^{31}$ and $R^{32}$ are each a $C_{1-6}$ alkyl group, a $C_{1-6}$ alkoxy group, or a halogen atom, and $R^{33}$ and $R^{34}$ are each a hydrogen atom.

[15] A diamine compound represented by formula (IVa):

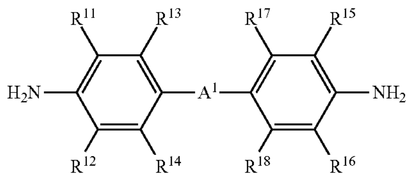

wherein $R^{11}$, $R^{12}$, $R^{13}$, $R^{14}$, $R^{15}$, $R^{16}$, $R^{17}$, and $R^{18}$ are each independently a hydrogen atom, a $C_{1-6}$ alkyl group, a $C_{1-6}$ alkoxy group, or a halogen atom, with a proviso that at least one of $R^{11}$, $R^{12}$, $R^{13}$, and $R^{14}$ is a $C_{1-6}$ alkyl group, a $C_{1-6}$ alkoxy group, or a halogen atom, with a proviso that at least one of $R^{15}$, $R^{16}$, $R^{17}$, and $R^{18}$ is a $C_{1-6}$ alkyl group, a $C_{1-6}$ alkoxy group, or a halogen atom, and with a proviso that at least one of $R^{11}$, $R^{12}$, $R^{13}$, $R^{14}$, $R^{15}$, $R^{16}$, $R^{17}$, and $R^{18}$ is not a fluorine atom, and $A^1$ is a linear or branched $C_{4-16}$ perfluoroalkylene group.

[16] The diamine compound according to [15], wherein $R^{11}$, $R^{12}$, $R^{15}$, and $R^{16}$ are each independently a $C_{1-6}$ alkyl group, a $C_{1-6}$ alkoxy group, or a halogen atom, and $R^{13}$, $R^{14}$, $R^{17}$, and $R^{18}$ are each a hydrogen atom.

[17] The diamine compound according to [15] or [16], wherein $R^{11}$, $R^{12}$, $R^{15}$, and $R^{16}$ are each a $C_{1-6}$ alkyl group, a $C_{1-6}$ alkoxy group, or a halogen atom, and $R^{13}$, $R^{14}$, $R^{17}$, and $R^{18}$ are each a hydrogen atom.

[18] A compound represented by formula (VI):

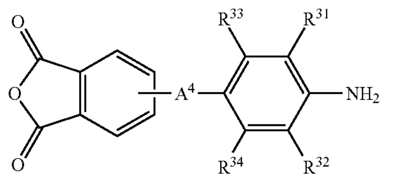

wherein $R^{31}$, $R^{32}$, $R^{33}$, and $R^{34}$ are each independently a hydrogen atom, a $C_{1-6}$ alkyl group, a $C_{1-6}$ alkoxy group, or a halogen atom, and $A^4$ is a linear or branched $C_{4-16}$ perfluoroalkylene group.

[19] The compound according to [18], wherein $R^{31}$ and $R^{32}$ are each independently a $C_{1-6}$ alkyl group, a $C_{1-6}$ alkoxy group, or a halogen atom, and $R^{33}$ and $R^{34}$ are each a hydrogen atom.

[20] The compound according to or [19], wherein $R^{31}$ and $R^{32}$ are each a $C_{1-6}$ alkyl group, a $C_{1-6}$ alkoxy group, or a halogen atom, and $R^{33}$ and $R^{34}$ are each a hydrogen atom.

[21] A method for producing a diamine compound represented by formula (IV):

$$H_2N—Ar^1\text{-}A^1\text{-}Ar^2—NH_2$$

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, and $A^1$ is a linear or branched $C_{4-16}$ perfluoroalkylene group;

the method comprising: reacting, under irradiation with light, a compound represented by formula (VII):

$$H—Ar^4—NH_2$$

wherein $Ar^4$ is a phenylene group substituted with one or more substituents, or an indolylene group optionally substituted with one or more substituents, and the substituent is a group selected from a $C_{1-6}$ alkyl group, a $C_{1-6}$ alkoxy group, and a halogen atom, and a compound represented by formula (VIII):

$$I\text{-}A^1\text{-}I$$

wherein $A^1$ is a linear or branched $C_{4-16}$ perfluoroalkylene group.

Advantageous Effect of Invention

The present invention can provide polyimides having various structures.

DESCRIPTION OF EMBODIMENTS

The present disclosure provides a polyimide compound represented by formula (I):

$$—\!\left(Ar^1—A^1—Ar^2—A^2\right)_{n1}\!—$$

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^2$ is an aliphatic or aromatic bisimide-N',N-diyl, and n1 is any integer.

In one embodiment, $Ar^1$ is a phenylene group substituted with one or more substituents each selected from a $C_{1-6}$ alkyl group, a $C_{1-6}$ alkoxy group, and a halogen atom.

In another embodiment, $Ar^1$ is an indolylene group optionally substituted with one or more substituents each selected from a $C_{1-6}$ alkyl group, a $C_{1-6}$ alkoxy group, and a halogen atom.

In one embodiment, $Ar^2$ is a phenylene group substituted with one or more substituents each selected from a $C_{1-6}$ alkyl group, a $C_{1-6}$ alkoxy group, and a halogen atom.

In another embodiment, $Ar^2$ is an indolylene group optionally substituted with one or more substituents each selected from a $C_{1-6}$ alkyl group, a $C_{1-6}$ alkoxy group, and a halogen atom.

In one embodiment, $Ar^1$ and $Ar^2$ are each a phenylene group substituted with one or more substituents each selected from a $C_{1-6}$ alkyl group, a $C_{1-6}$ alkoxy group, and a halogen atom.

In one embodiment, $Ar^1$ and $Ar^2$ are each an indolylene group optionally substituted with one or more substituents each selected from a $C_{1-6}$ alkyl group, a $C_{1-6}$ alkoxy group, and a halogen atom.

In one embodiment, the indolylene group is not substituted.

In another embodiment, the indolylene group is substituted with one or more substituents each selected from a $C_{1-6}$ alkyl group, a $C_{1-6}$ alkoxy group, and a halogen atom.

The polyimide compound of the present disclosure has improved adhesiveness to a metal surface due to having an indole ring.

The polyimide compound of the present disclosure may have one or more substituents on its aromatic ring, for example, the benzene ring or the indole ring as $Ar^1$ or $Ar^2$. The polyimide compound of the present disclosure may have various properties due to having such a substituent.

The $C_{1-6}$ alkyl group as a substituent on the phenylene group or indolylene group described above may be linear or branched, and is preferably a $C_{1-3}$ alkyl group and more preferably a methyl group or an ethyl group.

The polyimide compound of the present disclosure may have excellent flexibility and/or solubility in a solvent due to having a $C_{1-6}$ alkyl group as a substituent.

The $C_{1-6}$ alkoxy group as a substituent on the phenylene group or indolylene group described above may be linear or branched, and is preferably a $C_{1-3}$ alkoxy group, more preferably a methoxy group or an ethoxy group, and particularly preferably a methoxy group.

The polyimide compound of the present disclosure may have solubility in a solvent and/or excellent flexibility due to having a $C_{1-6}$ alkoxy group as a substituent.

The halogen atom as a substituent on the phenylene group or indolylene group described above is a fluorine atom, a chlorine atom, a bromine atom, or an iodine atom, and is preferably a fluorine atom or a chlorine atom.

In one embodiment, the halogen atom is a fluorine atom. The polyimide compound of the present disclosure may have excellent transparency, low dielectricity, and flame retardancy due to having a fluorine atom as a substituent.

In another embodiment, the halogen atom is a chlorine atom. The polyimide compound of the present disclosure may have great flame retardancy due to having a chlorine atom as a substituent.

In a preferable embodiment, the number of the substituents on the phenylene group or indolylene group described above may be two or more, for example, 2 to 4. When a plurality of such substituents are present, the substituents in $Ar^1$ or $Ar^2$ may be the same or different, and are preferably the same.

In a preferable embodiment, the substituent of the phenylene group or indolylene group is bonded to the atom adjacent to the atom bonding to $A^2$. For example, in the case where $Ar^1$ or $Ar^2$ is a phenylene group, the $C_{1-6}$ alkyl group, $C_{1-6}$ alkoxy group, or halogen atom is located on the ortho-position to the atom bonding to $A^2$.

In a more preferable embodiment, the phenylene group or indolylene group has the same $C_{1-6}$ alkyl groups, preferably, methyl groups or ethyl groups, as the substituents, on the two atoms adjacent to the atom bonding to $A^2$. The polyimide compound of the present disclosure may have a higher glass transition temperature, and the char production rate may be improved due to having the same $C_{1-6}$ alkyl groups, preferably, methyl groups or ethyl groups.

$A^1$ is a linear or branched $C_{4-16}$ perfluoroalkylene group. The $C_{4-16}$ perfluoroalkylene group is preferably a $C_{4-12}$ perfluoroalkylene group, more preferably a $C_{4-10}$ perfluoroalkylene group, and even more preferably a $C_{4-8}$ perfluoroalkylene group. In one embodiment, the $C_{4-16}$ perfluoroalkylene group is linear. In another embodiment, the $C_{4-16}$ perfluoroalkylene group is branched. In a preferable embodiment, the $C_{4-16}$ perfluoroalkylene group is a linear $C_{4-8}$ perfluoroalkylene group.

The polyimide compound of the present disclosure can be improved in terms of transparency, flexibility, low dielectricity, and/or solubility in a solvent due to including $C_{4-16}$ perfluoroalkylene group as $A^1$.

$A^2$ is an aliphatic or aromatic bisimide-N',N-diyl, or in other words, is a group having two following structures:

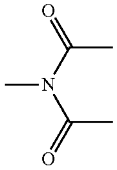

$A^2$ is typically derived from a tetracarboxylic acid as a starting material of the polyimide represented by formula (I).

n1 is any integer, and may preferably be 2 to 500, more preferably 2 to 100, even more preferably 5 to 100, and particularly preferably 5 to 50.

In a preferable embodiment, formula (I) is formula (Ia):

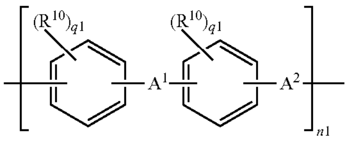

wherein $R^{10}$ is each independently a $C_{1-6}$ alkyl group, a $C_{1-6}$ alkoxy group, or a halogen atom, q1 is an integer of 1 to 4, preferably 2 to 4, and more preferably 2, $A^1$ is a linear or branched $C_{4-16}$ perfluoroalkylene group, $A^2$ is an aliphatic or aromatic bisimide-N',N-diyl, and n1 is any integer.

In a preferable embodiment, formula (I) is formula (Ia'):

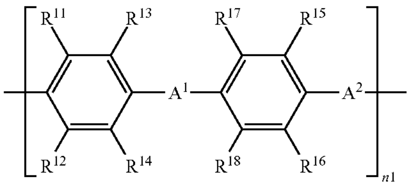

wherein $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^2$ is an aliphatic or aromatic bisimide-N',N-diyl, and n1 is any integer.

In other words, $Ar^1$ in formula (I) is a group represented by the following formula:

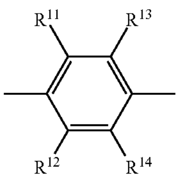

and $Ar^2$ in formula (I) is a group represented by the following formula:

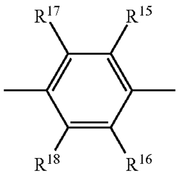

In another preferable embodiment, formula (I) is formula (Ia"):

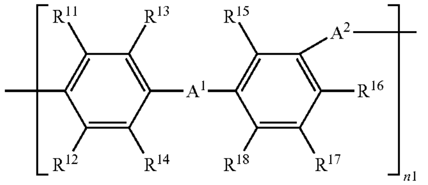

wherein $R^{11}$, $R^{12}$, $R^{15}$, $R^{16}$, $R^{13}$, $R^{14}$, $R^{17}$, $R^{18}$, $A^1$, $A^2$, and n1 each have the same meaning as defined in formula (Ia').

The polyimide compound represented by formula (Ia") may have improved flexibility and improved transparency, as compared to the polyimide compound represented by formula (Ia').

In a more preferable embodiment, $R^{11}$ and $R^{12}$ are each a $C_{1-6}$ alkyl group, a $C_{1-6}$ alkoxy group, or a halogen atom; $R^{15}$ and $R^{16}$ are each a $C_{1-6}$ alkyl group, a $C_{1-6}$ alkoxy group, or a halogen atom; and $R^{13}$, $R^{14}$, $R^{17}$, and $R^{18}$ are each a hydrogen atom.

In a preferable embodiment, formula (I) is formula (Ib):

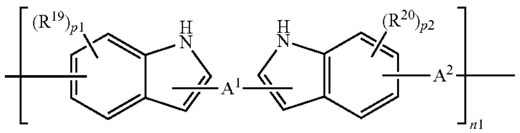

wherein $R^{19}$ is independently in each occurrence a $C_{1-6}$ alkyl group, a $C_{1-6}$ alkoxy group, or a halogen atom, $R^{20}$ is independently in each occurrence a $C_{1-6}$ alkyl group, a $C_{1-6}$ alkoxy group, or a halogen atom, p1 is an integer of 0 to 5, p2 is an integer of 0 to 5, $A^1$ is a linear or branched $C_{4-16}$ perfluoroalkylene group, $A^2$ is an aliphatic or aromatic bisimide-N',N-diyl, and n1 is any integer. $R^{19}$ and $R^{20}$ are each a substituent bonded to the indole ring and may be bonded to the indole ring at any position.

In a preferable embodiment, $A^1$ is bonded to the indole ring at the 2- or 3-position. In one embodiment, $A^1$ is bonded to the indole ring at the 3-position. In another embodiment, $A^1$ is bonded to one indole ring at the 2-position and bonded to the other indole ring at the 3-position.

In a preferable embodiment, $Ar^2$ is boned to the indole ring at any of the 4- to 7-positions, preferably the 5- or 6-position, and more preferably the 5-position.

In one embodiment, p1 and p2 are each 0.

In another embodiment, p1 and p2 are each an integer of 1 to 5, and preferably an integer of 2 to 4, for example, 2.

In one embodiment, formula (I) is formula (Ic):

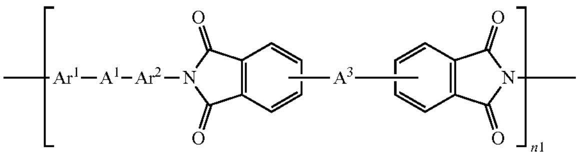

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^3$ is a single bond or a divalent organic group, and n1 is any integer.

In other words, $A^2$ in formula (I) is a group represented by the following formula:

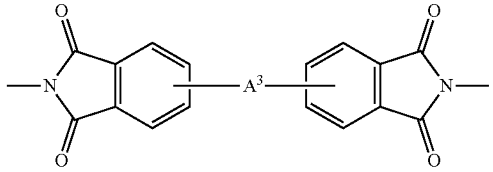

In a preferable embodiment, $A^3$ is a single bond, a linear or branched $C_{1-16}$ alkylene group optionally substituted with a fluorine atom, an oxygen atom, —CO—, —C≡C—, —$SO_2$—,

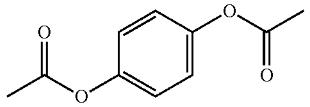

or

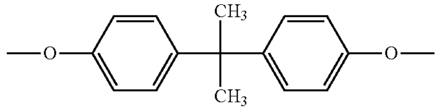

The $C_{1-16}$ alkylene group of the linear or branched $C_{1-16}$ alkylene group optionally substituted with a fluorine atom, as $A^3$, may be preferably a $C_{1-10}$ alkylene group, and more preferably a $C_{1-6}$ alkylene group.

In one embodiment, the $C_{1-16}$ alkylene group is substituted with one or more fluorine atoms. In one embodiment, all hydrogen atoms in the $C_{1-16}$ alkylene group may be replaced with fluorine atoms, or that is, the $C_{1-16}$ alkylene group may be a perfluoroalkylene group.

In a preferable embodiment, $A^2$ is a group selected from the following groups.

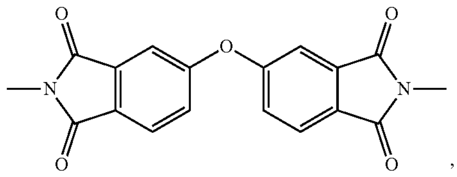

,

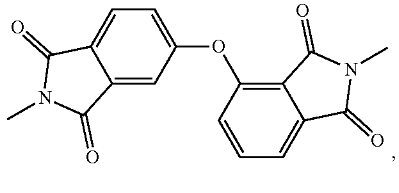

,

-continued
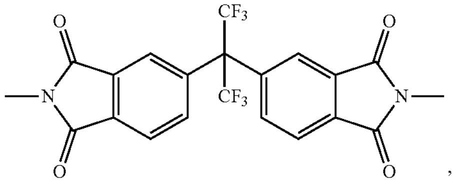
,
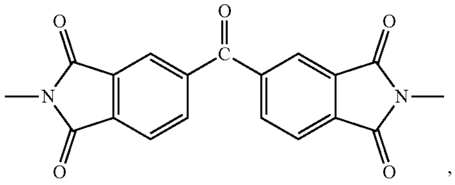
,
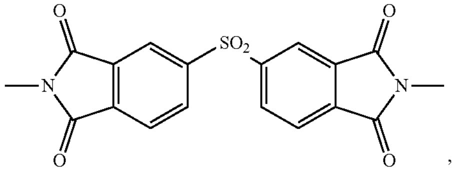
,
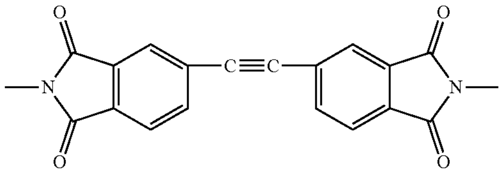
,
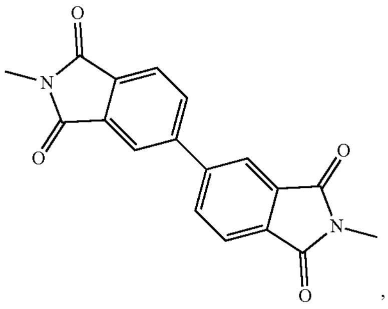
,
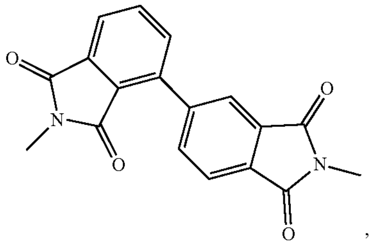
,
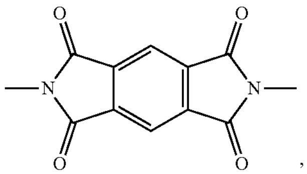
,
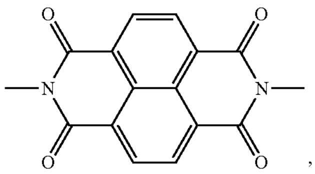
,
-continued
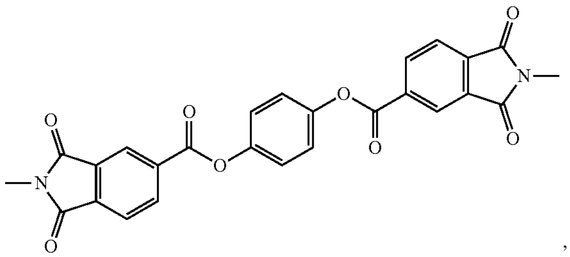
,
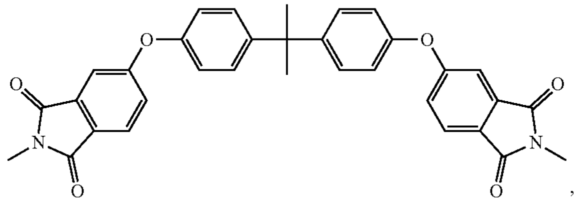
,
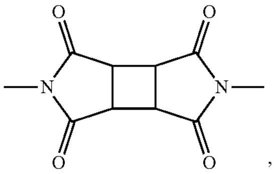
,
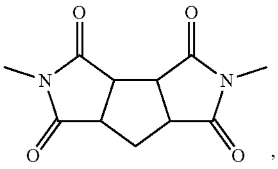
,
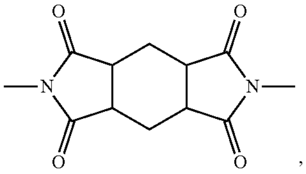
,
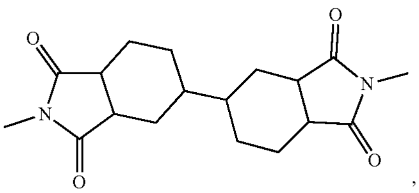
,
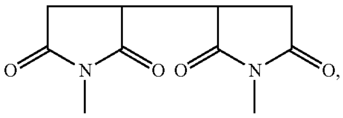
,
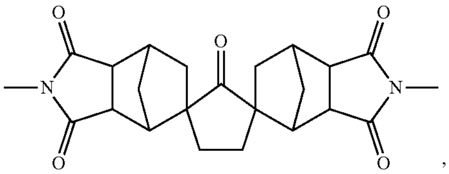
,
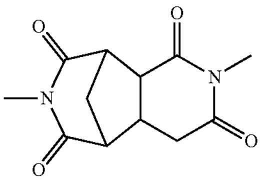
In a preferable embodiment, formula (I) is represented by formula (Id):

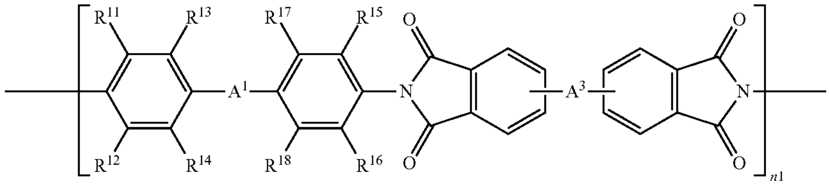

wherein $R^{11}$, $R^{12}$, $R^{13}$, $R^{14}$, $R^{15}$, $R^{16}$, $R^{17}$, and $R^{18}$ are each independently a hydrogen atom, a $C_{1-6}$ alkyl group, a $C_{1-6}$ alkoxy group, or a halogen atom, with a proviso that at least one of $R^{11}$, $R^{12}$, $R^{13}$, and $R^{14}$ is a $C_{1-6}$ alkyl group, a $C_{1-6}$ alkoxy group, or a halogen atom, and that at least one of $R^{15}$, $R^{16}$, $R^{17}$, and $R^{18}$ is a $C_{1-6}$ alkyl group, a $C_{1-6}$ alkoxy group, or a halogen atom, $A^1$ is a linear or branched $C_{4-16}$ perfluoroalkylene group, $A^3$ is a single bond or a divalent organic group, and n1 is any integer.

The present disclosure also provides an intermediate for producing the above-described polyimide compound.

The intermediate is a compound represented by formula (II) below:

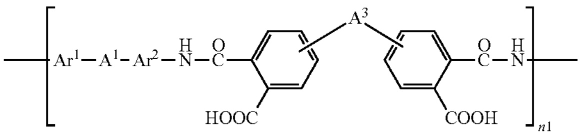

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, $A^1$ is a linear or branched $C_{4-16}$ perfluoroalkylene group, $A^3$ is a divalent organic group, and n1 is any integer.

In a preferable embodiment, formula (II) is a compound represented by formula (IIa):

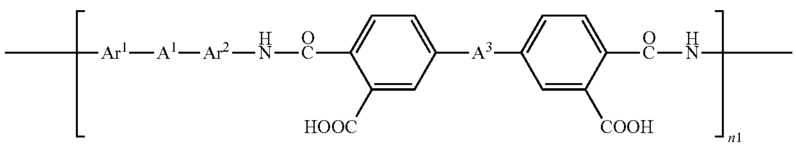

wherein $Ar^1$, $Ar^2$, $A^1$, $A^2$, and n1 each have the same meaning as defined in formula (II).

The polyimide compound represented by formula (I) described above can be obtained by (1) reacting a tetracarboxylic acid or an anhydride thereof with a diamine compound represented by formula (IV):

$H_2N—Ar^1\text{-}A^1\text{-}Ar^2—NH_2$ wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, and $A^1$ is a linear or branched $C_{4-16}$ perfluoroalkylene group.

In one embodiment, $Ar^1$ is a phenylene group substituted with one or more substituents each selected from a $C_{1-6}$ alkyl group, a $C_{1-6}$ alkoxy group, and a halogen atom, and $Ar^2$ is a phenylene group substituted with one or more substituents each selected from a $C_{1-6}$ alkyl group, a $C_{1-6}$ alkoxy group, and a halogen atom.

In one embodiment, the compound represented by formula (IV) is a diamine compound represented by formula (IVa):

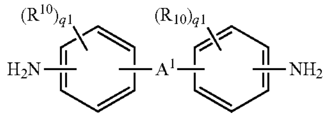

wherein $R^{10}$ is each independently a $C_{1-6}$ alkyl group, a $C_{1-6}$ alkoxy group, or a halogen atom, q1 is an integer of 1 to 4, preferably 2 to 4, and more preferably 2, and $A^1$ is a linear or branched $C_{4-16}$ perfluoroalkylene group.

In one embodiment, the compound represented by formula (IV) is a diamine compound represented by formula (IVb):

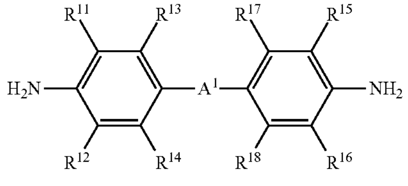

$R^{11}$, $R^{12}$, $R^{13}$, $R^{14}$, $R^{15}$, $R^{16}$, $R^{17}$, and $R^{18}$ are each independently a hydrogen atom, a $C_{1-6}$ alkyl group, a $C_{1-6}$ alkoxy group, or a halogen atom, with a proviso that at least one of $R^{11}$, $R^{12}$, $R^{13}$, and $R^{14}$ is a $C_{1-6}$ alkyl group, a $C_{1-6}$ alkoxy group, or a halogen atom, with a proviso that at least one of $R^{15}$, $R^{16}$, $R^{17}$, and $R^{18}$ is a $C_{1-6}$ alkyl group, a $C_{1-6}$ alkoxy group, or a halogen atom, and with a proviso that at least one of $R^{11}$, $R^{12}$, $R^{13}$, $R^{14}$, $R^{15}$, $R^{16}$, $R^{17}$, and $R^{18}$ is not a fluorine atom, and $A^1$ is a linear or branched $C_{4-16}$ perfluoroalkylene group.

In another embodiment, a compound represented by formula (IV) is a diamine compound represented by formula (IVc):

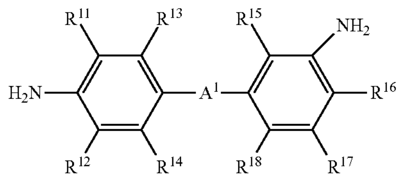

wherein $R^1$, $R^{12}$, $R^{15}$, $R^{16}$, $R^{13}$, $R^{14}$, $R^{17}$, $R^{18}$, and $A^1$ each have the same meaning as defined in formula (IVb).

In a preferable embodiment, $R^{11}$, $R^{12}$, $R^{15}$, and $R^{16}$ are each independently a $C_{1-6}$ alkyl group, a $C_{1-6}$ alkoxy group, or a halogen atom, and $R^{13}$, $R^{14}$, $R^{17}$, and $R^{18}$ are each a hydrogen atom.

In a further preferable embodiment, $R^{11}$, $R^{12}$, $R^{15}$, and $R^{16}$ are each a $C_{1-6}$ alkyl group, a $C_{1-6}$ alkoxy group, or a halogen atom, and $R^{13}$, $R^{14}$, $R^{17}$, and $R^{18}$ are each a hydrogen atom.

In another embodiment, Art is an indolylene group optionally substituted with one or more substituents each selected from a $C_{1-6}$ alkyl group, a $C_{1-6}$ alkoxy group, and a halogen atom, and Are is an indolylene group optionally substituted with one or more substituents each selected from a $C_{1-6}$ alkyl group, a $C_{1-6}$ alkoxy group, and a halogen atom.

In another embodiment, the compound represented by formula (IV) is a diamine compound represented by formula (IVd):

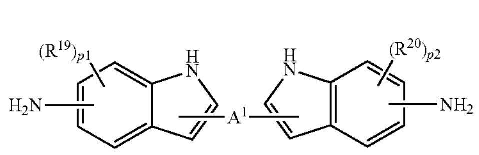

wherein $R^{19}$ is independently in each occurrence a $C_{1-6}$ alkyl group, a $C_{1-6}$ alkoxy group, or a halogen atom, $R^{20}$ is independently in each occurrence a $C_{1-6}$ alkyl group, a $C_{1-6}$ alkoxy group, or a halogen atom, p1 is an integer of 0 to 5, p2 is an integer of 0 to 5, and $A^1$ is a linear or branched $C_{4-16}$ perfluoroalkylene group.

In one embodiment, p1 and p2 are each 0.

In another embodiment, p1 and p2 are each an integer of 1 to 5, and preferably an integer of 2 to 4, for example, 2.

In a preferable embodiment, $A^1$ is a $C_{4-12}$ perfluoroalkylene group, more preferably a $C_{4-10}$ perfluoroalkylene group, and even more preferably a $C_{4-8}$ perfluoroalkylene group. In one embodiment, the $C_{4-16}$ perfluoroalkylene group is linear. In another embodiment, the $C_{4-16}$ perfluoroalkylene group is branched.

The diamine compound represented by formula (IV):

$$H_2N—Ar^1\text{-}A^1\text{-}Ar^2—NH_2$$

wherein $Ar^1$ is a phenylene group substituted with one or more substituents, or an indolylene group optionally substituted with one or more substituents, $Ar^2$ is a phenylene group substituted with one or more substituents, or an indolylene group optionally substituted with one or more substituents, the substituent is a group selected from a $C_{1-6}$ alkyl group, a $C_{1-6}$ alkoxy group, and a halogen atom, and $A^1$ is a linear or branched $C_{4-16}$ perfluoroalkylene group;

can be obtained by reacting, under irradiation with light, a compound represented by formula (VII):

$$H—Ar^4—NH_2$$

wherein $Ar^4$ is a phenylene group substituted with one or more substituents, or an indolylene group optionally substituted with one or more substituents, and the substituent is a group selected from a $C_{1-6}$ alkyl group, a $C_{1-6}$ alkoxy group, and a halogen atom, and a compound represented by formula (VIII):

$$I\text{-}A^1\text{-}I$$

wherein $A^1$ is a linear or branched $C_{4-16}$ perfluoroalkylene group.

$Ar^4$ corresponds to $Ar^1$ and $Ar^2$ in formula (IV).

In the above-described reaction, one compound represented by formula (VII) reacts with two compounds represented by formula (VIII). The two compounds represented by formula (VIII) may have the same structure or may have different structures. Preferably, the compounds represented by formula (VIII) are of a single type. That is, one compound represented by formula (VII) reacts with two compounds having the same structure represented by formula (VIII).

In one embodiment, $Ar^1$ is a phenylene group substituted with one or more substituents each selected from a $C_{1-6}$ alkyl group, a $C_{1-6}$ alkoxy group, and a halogen atom, $Ar^2$ is a phenylene group substituted with one or more substituents each selected from a $C_{1-6}$ alkyl group, a $C_{1-6}$ alkoxy group, and a halogen atom, and $Ar^4$ is a phenylene group substituted with one or more substituents each selected from a $C_{1-6}$ alkyl group, a $C_{1-6}$ alkoxy group, and a halogen atom.

In another embodiment, $Ar^1$ is an indolylene group optionally substituted with one or more substituents each selected from a $C_{1-6}$ alkyl group, a $C_{1-6}$ alkoxy group, and a halogen atom, $Ar^2$ is an indolylene group optionally substituted with one or more substituents each selected from a $C_{1-6}$ alkyl group, a $C_{1-6}$ alkoxy group, and a halogen atom, and $Ar^4$ is an indolylene group optionally substituted with one or more substituents each selected from a $C_{1-6}$ alkyl group, a $C_{1-6}$ alkoxy group, and a halogen atom.

The irradiation with light described above is preferably irradiation with ultraviolet rays, and is performed by irradiating with light having a wavelength of 300 to 400 nm, for example, a wavelength of 350 to 380 nm.

Examples of the light source used for the irradiation with light includes, but not particularly limited to, an LED, a mercury lamp, a xenon lamp, a UV lamp, and a halogen lamp, and an LED is preferably used.

The reaction described above can preferably be performed with a basic compound, a catalyst, a one-electron reductant, or a radical generator.

Examples of the basic compound include an inorganic base, such as $Cs_2CO_3$, $K_2CO_3$, $Na_2CO_3$, $Li_2CO_3$, CsF, $CsHCO_3$, $KHCO_3$, $NaHCO_3$, and $LiHCO_3$; an amine compound such as triethylamine, tributylamine, diisopropylethylamine, N,N,N',N'-tetramethyleRediamine, N,N,N',N'-tetraethylenediamine, pyrrolidine, pyridine, collidine, ammonia, dimethylamine, and DBU; tributylphosphine, triphenylphosphine, triarylphosphines, and disubstituted phosphines, and $Cs_2CO_3$ is preferably used.

Examples of the catalyst include a transition metal complex, an organic dye compound, and an enamine compound.

Examples of the central metal of the transition metal complex include cobalt, ruthenium, rhodium, rhenium, iridium, zinc, nickel, palladium, osmium, and platinum.

Examples of the organic dye compound include Rose Bengal, Erythrosine, Eosin (e.g., Eosin B, Eosin Y), Acriflavin, Lipoflavin, Thionin, Phenoxazine, and Phenothiazine.

The enamine compound has a structure represented by

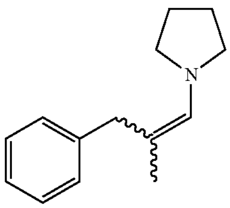

and is a chemical species generated by a reaction between an aldehyde compound:

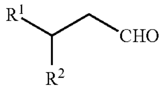

wherein $R^1$ is a phenyl group or a benzyl group, and $R^2$ is a hydrogen atom, a methyl group, or a phenyl group, and a pyrrolidine compound:

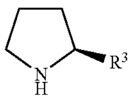

wherein $R^3$ is a hydrogen atom or a bis(3,4-dimethoxyphenyl)methoxymethyl group. An enamine compound that has been synthesized beforehand may be added, or an aldehyde compound and a pyrrolidine compound may be directly added to generate the catalyst in the reaction system.

Examples of the aldehyde compound include 3-phenyl-2-methylpropanal, 2-phenylpropanal, diphenylacetaldehyde, and phenylacetaldehyde.

Examples of the pyrrolidine compound include pyrrolidine, and (S)-2-[3,4-bis(dimethoxyphenyl)methoxymethyl] pyrrolidine.

Examples of the one-electron reductant include sodium thiosulfate, lithium dithionite, sodium dithionite, potassium dithionite, cesium dithionite, copper(I) iodide, copper(I) bromide, copper(I) chloride, triethylamine, tributylamine, tetrabutylammonium iodide, tetrabutylphosphonium iodide, ascorbic acid, an ascorbate salt, zinc powder, indium powder, and magnesium powder. Preferred is sodium thiosulfate, sodium dithionite, copper(I) iodide, and copper(I) bromide, and sodium thiosulfate or sodium dithionite is particularly preferred.

Examples of the radical generator include an organic peroxide, an inorganic peroxide, and an organic azo compound, and an organic peroxide is preferably used. Examples include, but not limited to, benzoyl peroxide as the organic peroxide, potassium persulfite as the inorganic peroxide, and azobisisobutyronitrile (AIBN) as the organic azo compound.

The reaction described above is preferably carried out in a solvent. Examples of the solvent include, but not particularly limited to, dichloromethane, chloroform, carbon tetrachloride, dichloroethane, dichloropentafluoropropane (HCFC-225), C5-C12 perfluoroaliphatic hydrocarbons (e.g., perfluorohexane, perfluoromethylcyclohexane and perfluoro-1,3-dimethylcyclohexane); a polyfluoroaromatic hydrocarbon (e.g. bis(trifluoromethyl)benzene); a polyfluoroaliphatic hydrocarbon (e.g., $C_6F_{13}CH_2CH_3$ (ASAHIKLIN (registered trademark) AC-6000, manufactured by AGC Inc.)), 1,1,2,2,3,3,4-heptafluorocyclopentane (e.g., ZEORORA (registered trademark) H, manufactured by ZEON CORPORATION), a hydrofluoroether (HFE) such as an alkyl perfluoroalkyl ether (the perfluoroalkyl group and the alkyl group may be linear or branched), perfluoropropyl methyl ether ($C_3F_7OCH_3$) (e.g., Novec (registered trademark) 7000, manufactured by 3M), perfluorobuthyl methyl ether ($C_4F_9OCH_3$) (e.g., Novec (registered trademark) 7100, manufactured by 3M), perfluorobuthyl ethyl ether ($C_4F_9OC_2H_5$) (e.g., Novec (registered trademark) 7200, manufactured by 3M), perfluorohexyl methyl ether ($C_2F_5CF(OCH_3)C_3F_7$ (e.g., Novec (registered trademark) 7300, manufactured by 3M), or $CF_3CH_2OCF_2CHF_2$ (e.g., ASAHIKLIN (registered trademark) AE-3000, manufactured by AGC Inc).

The reaction temperature in the reaction may be preferably 0 to 60° C., and more preferably 10 to 40° C., for example, room temperature.

The reaction time in the reaction may be, for example, 1 to 72 hours, and preferably 12 to 48 hours.

The tetracarboxylic acid or the anhydride thereof is not particularly limited as long as it can react with the diamine compound to form a polyimide compound, and may be an aliphatic or aromatic tetracarboxylic acid or an anhydride thereof.

In a preferable embodiment, the tetracarboxylic acid or the anhydride thereof is a tetracarboxylic acid anhydride.

Examples of the aliphatic tetracarboxylic acid anhydride include the following compounds.

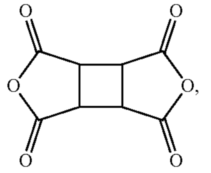
,
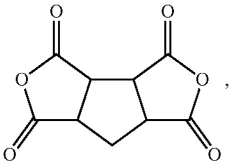
,
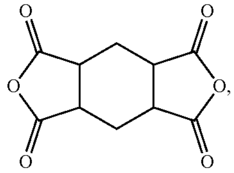
,

-continued
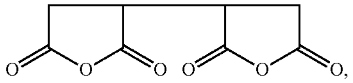
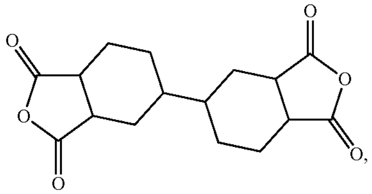
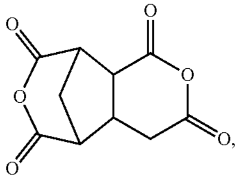
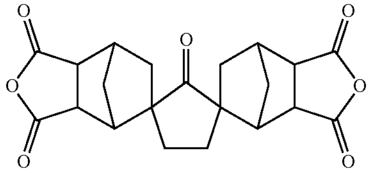
Examples of the aromatic tetracarboxylic acid anhydride include the following compounds.
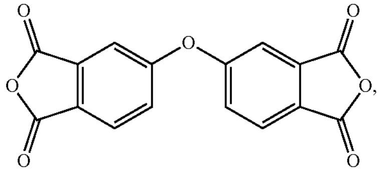
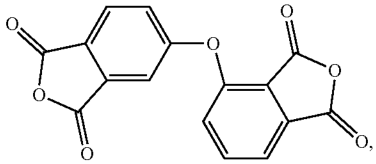
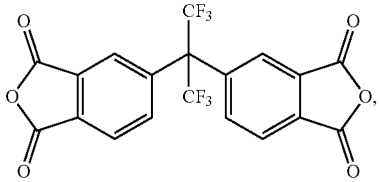
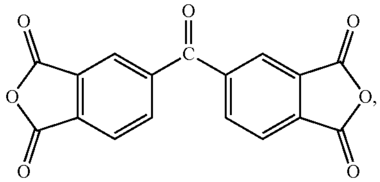
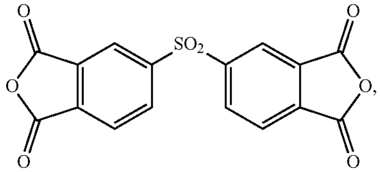
-continued
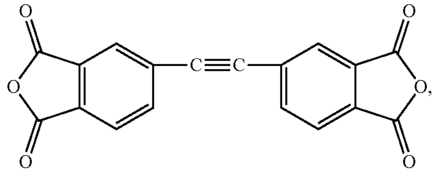
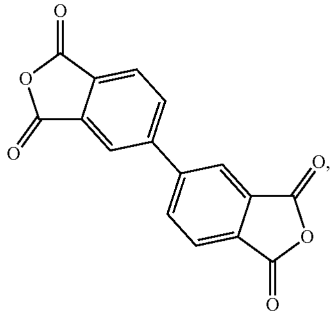
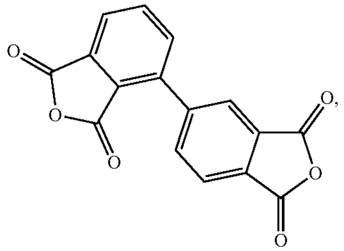
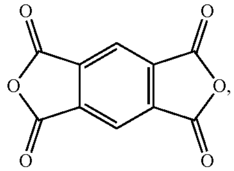
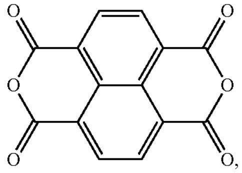
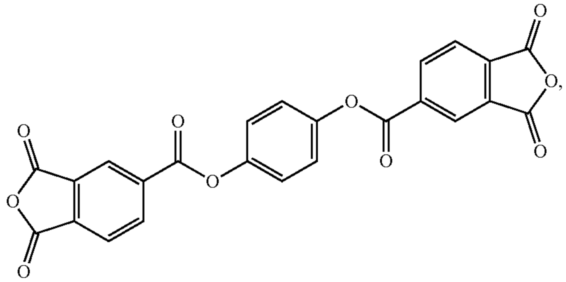
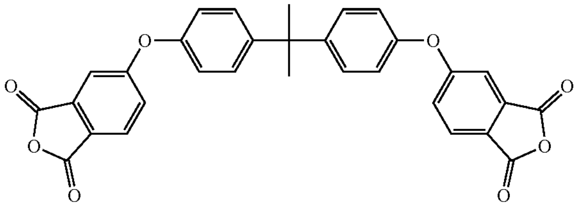
The present disclosure also provides a polyimide compound represented by formula (III):

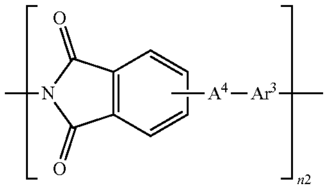

wherein $Ar^3$ is an optionally substituted phenylene group or indolylene group, $A^4$ is a linear or branched $C_{4-16}$ perfluoroalkylene group, and n2 is any integer.

The polyimide compound represented by formula (III) described above may have a large solubility since moieties derived from phthalic acid and aromatic moieties ($Ar^3$) are present alternately to thereby generate polarization in the direction of the main chain of the molecular.

In one embodiment, $Ar^3$ is an optionally substituted phenylene group.

In one embodiment, $Ar^3$ is an optionally substituted indolylene group.

Examples of the substituent of the optionally substituted phenylene group or indolylene group as $Ar^3$ include a $C_{1-6}$ alkyl group, a $C_{1-6}$ alkoxy group, and a halogen atom.

The $C_{1-6}$ alkyl group may be linear or branched, and is preferably a $C_{1-3}$ alkyl group, and more preferably a methyl group.

The $C_{1-6}$ alkoxy group may be linear or branched, and is preferably a $C_{1-3}$ alkoxy group, more preferably a methoxy group or a methyl group, and particularly preferably a methoxy group.

The halogen atom is a fluorine atom, a chlorine atom, a bromine atom, or an iodine atom, and is preferably a fluorine atom or a chlorine atom, and more preferably a fluorine atom.

$A^4$ is a linear or branched $C_{4-16}$ perfluoroalkylene group. The $C_{4-16}$ perfluoroalkylene group is preferably a $C_{4-12}$ perfluoroalkylene group, more preferably a $C_{4-10}$ perfluoroalkylene group, and even more preferably a $C_{4-8}$ perfluoroalkylene group. In one embodiment, the $C_{4-16}$ perfluoroalkylene group is linear. In another embodiment, the $C_{4-16}$ perfluoroalkylene group is branched.

n2 is any integer, and may be preferably 2 to 500, more preferably 2 to 100, even more preferably 5 to 100, and particularly preferably 5 to 50.

In a preferable embodiment, the formula (III) described above is represented by formula (IIIa):

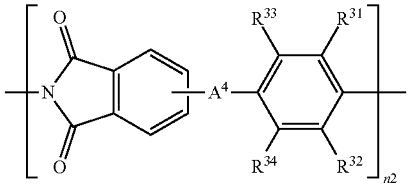

wherein $R^{31}$, $R^{32}$, $R^{33}$, and $R^{34}$ are each independently a hydrogen atom, a $C_{1-6}$ alkyl group, a $C_{1-6}$ alkoxy group, or a halogen atom, $A^4$ is a linear or branched $C_{4-16}$ perfluoroalkylene group, and n2 is any integer.

In a preferable embodiment, $R^{31}$ and $R^{32}$ are each independently a $C_{1-6}$ alkyl group, a $C_{1-6}$ alkoxy group, or a halogen atom, and $R^{33}$ and $R^{34}$ are each hydrogen atom.

In a more preferable embodiment, $R^{31}$ and $R^{32}$ are each a $C_{1-6}$ alkyl group, a $C_{1-6}$ alkoxy group, or a halogen atom, and $R^{33}$ and $R^{34}$ are each hydrogen atom.

The polyimide compound represented by formula (III) described above can be obtained by polymerizing a dicarboxylic acid having an amino group or an anhydride thereof.

For example, the compound represented by formula (IIIa) can be obtained by polymerizing a compound represented by formula (VI):

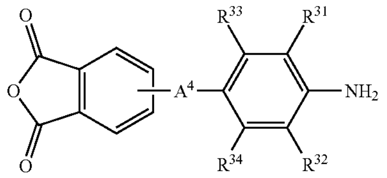

wherein $R^{31}$, $R^{32}$, $R^{33}$, and $R^{34}$ are each independently a hydrogen atom, a $C_{1-6}$ alkyl group, a $C_{1-6}$ alkoxy group, or a halogen atom, and $A^4$ is a linear or branched $C_{4-16}$ perfluoroalkylene group.

The compound represented by formula (VI) may have a large solubility since phthalic acid anhydride moieties and benzene ring moieties are present to thereby generate polarization in the direction of the main chain of the molecular.

In a preferable embodiment, $R^{31}$ and $R^{32}$ in formula (VI) are each independently a $C_{1-6}$ alkyl group, a $C_{1-6}$ alkoxy group, or a halogen atom, and $R^{33}$ and $R^{34}$ in formula (VI) are each a hydrogen atom.

In a more preferable embodiment, $R^{31}$ and $R^{32}$ in formula (VI) are each a $C_{1-6}$ alkyl group, a $C_{1-6}$ alkoxy group, or a halogen atom, and $R^{33}$ and $R^{34}$ in formula (VI) are each a hydrogen atom.

The polyimide compound represented by formula (I) and the polyimide compound represented by formula (III) of the present disclosure can be used for various applications.

Examples of the application include automobile components, aircraft components, and electrical and electronic components, coatings, and adhesives.

The polyimide of the present disclosure as well as the production method and the intermediate thereof have been described above in detail. The applications, the production method, etc. of the polyimide of the present disclosure are not limited to those illustrated above.

EXAMPLES

The polyimide of the present disclosure will be described more specifically by way of Examples below; however, the present invention is not limited to these Examples.

Example 1

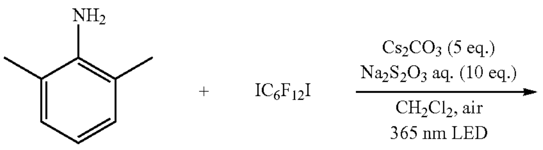

1
(10 eq.)

-continued

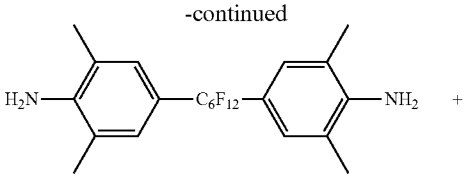

2a
60%[a)]

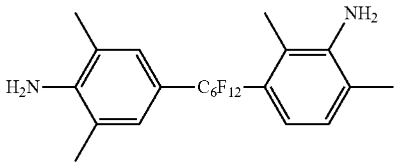

2b
15%[a)]

a) Determined by 19F NMR

To a dodecafluoro-1,6-diiodohexane (0.3 mmol, 70 μL) solution in dichloromethane (2 mL), 10 equivalents of 2,6-xylidine (1), 5 equivalents of cesium carbonate, and 10 equivalents of sodium thiosulfate aqueous solution (1 mL) were added, and the mixture was irradiated with light using LED of a wavelength 365 nm in atmospheric air. As a result, the target diamine compound 2a and 2b were obtained with yields of 60% and 15%, respectively.

Diamine Compound 2a $^{1}$H NMR (400 MHz, $CDCl_3$) δ=7.13; (4H, s), 3.85; (4H, br s), 2.20; (12H, s).

$^{19}$F NMR (376 MHz, $CDCl_3$) δ=−109.6; (4F, s), −121.9; (4F, s), −122.3; (4F, s).

$^{13}$C NMR (150 MHz, $CDCl_3$) δ=145.9, 126.7, 121.0, 117.6; (t, J=24.0 Hz), 18.0.

Diamine Compound 2b $^{1}$H NMR (400 MHz, $CDCl_3$) δ=7.14; (2H, s), 7.03; (1H, d, J=8.2 Hz), 6.93; (1H, d, J=8.2 Hz), 3.86; (2H, br s), 3.74; (2H, br s), 2.22; (6H, s), 2.21; (6H, s).

$^{19}$F NMR (376 MHz, $CDCl_3$) δ=−104.5; (2F, s), −109.6; (2F, s), −121.0; (2F, s), −121.8; (2F, s), −122.1; (2F, s), −122.2; (2F, s).

$^{13}$C NMR (150 MHz, $CDCl_3$) δ=145.9, 144.0, 131.6, 127.6, 126.7, 121.0, 118.4-117.5; (m), 18.1, 17.6.

Example 2

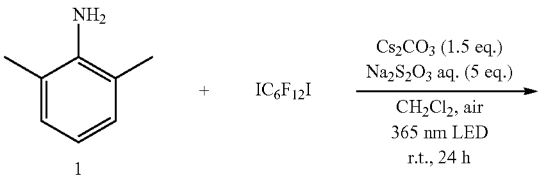

1
(10 eq.)

-continued

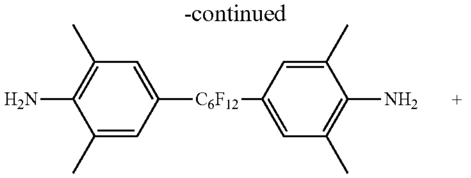

2a
60%[a)]

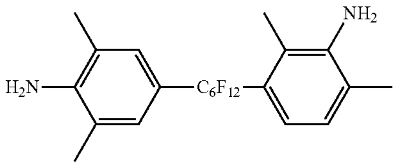

2b
21%[a)]

a) Determined by 19F NMR

To a dodecafluoro-1,6-diiodohexane (0.3 mmol, 70 μL) solution in dichloromethane (4 mL), 10 equivalents of 2,6-xylidine (1), 1.5 equivalents of cesium carbonate, and 5 equivalents of sodium thiosulfate aqueous solution (2 mL) were added, and the mixture was irradiated with light using LED of a wavelength 365 nm in atmospheric air. As a result, the target diamine compounds 2a and 2b were obtained with yields of 60% and 21%, respectively.

Example 3

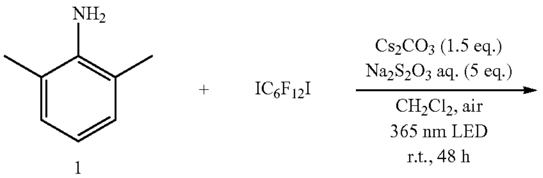

1
(5 eq.)

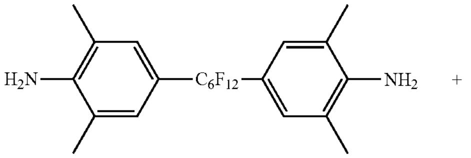

2a
56%[a)]

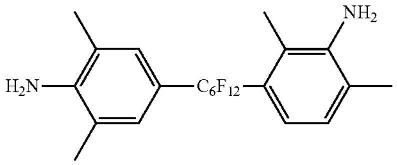

2b
20%[a)]

a) Determined by 19F NMR

To a dodecafluoro-1,6-diiodohexane (0.6 mmol, 335.6 mg) solution in dichloromethane (5 mL), 5 equivalents of 2,6-xylidine (1), 1.5 equivalents of cesium carbonate, and 5 equivalents of sodium thiosulfate aqueous solution (4 mL) were added, and the mixture was irradiated with light for 48 hours using LED of a wavelength 365 nm in atmospheric air.

As a result, the target diamine compounds 2a and 2b were obtained with yields of 56% and 20%, respectively.

Example 4

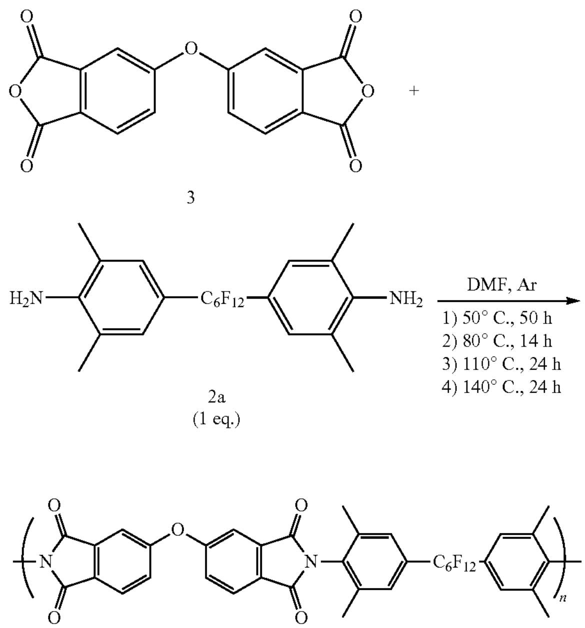

3

2a
(1 eq.)

4a: 78%

$M_n{}^{b,c)} = 1.3 \times 10^4$, $M_w/M_n{}^{b,c)} = 2.45$

| 2a (conv.)[a] | |
|---|---|
| AA | Imide |
| 1) 68% | 0% |
| 2) 46% | 24% |
| 3) 0% | 85% |
| 4) 0% | 100% |

a) Determined by 19F NMR
b) Insoluble in hexane
c) Determined by GPC (THF, with linear polystyrene as reference substance)

To a 4,4'-oxydiphthalic anhydride (3) (0.13 mmol, 41.2 mg) solution in DMF (N,N-dimethylformamide) (20 wt %), an equimolar amount of diamine compound (2a) was added, and the mixture was stirred in an argon atmosphere at 50° C. for 50 hours, and then, 80° C. for 14 hours, 110° C. for 24 hours, and 140° C. for 24 hours, sequentially. As a result, polyimide 4a having a number average molecular weight of 13000 was obtained with a yield of 78%. In this process, production of the target PAA (polyamic acid) intermediate and PI (polyimide) was confirmed after each reaction time. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 4a $^1$H NMR (400 MHz, $CDCl_3$) δ=8.05; (2H, d, J=8.2 Hz), 7.59; (2H, s), 7.56; (2H, d, J=8.2 Hz), 7.44; (4H, s), 2.26; (12H, s).

$^{19}$F NMR (376 MHz, $CDCl_3$) δ=−111.2; (4F, s), −121.7; (8F, s).

Example 5

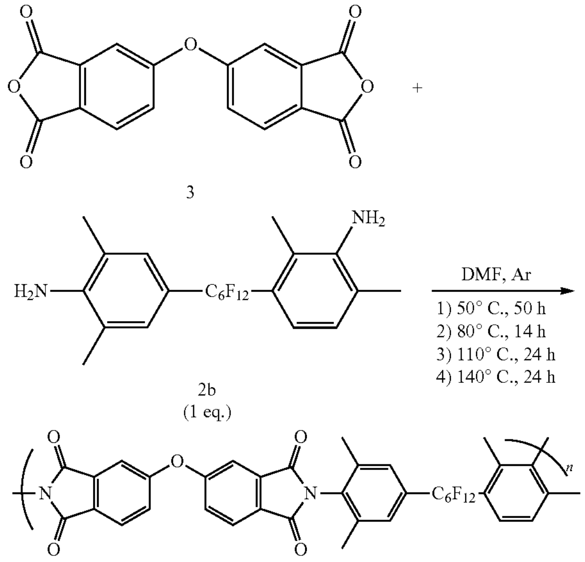

3

2b
(1 eq.)

4b: 56%

$M_n{}^{b,c)} = 6.4 \times 10^3$, $M_w/M_n{}^{b,c)} = 1.99$

| 2b (conv.)[a] | |
|---|---|
| AA | Imide |
| 1) 72% | 12% |
| 2) 55% | 34% |
| 3) 9% | 91% |
| 4) 0% | 100% |

a) Determined by 19F NMR
b) Insoluble in hexane
c) Determined by GPC (THF, with linear polystyrene as reference substance)

To a 4,4'-oxydiphthalic anhydride (3) (0.19 mmol, 101.3 mg) solution in DMF (20 wt %), an equimolar amount of diamine compound (2b) was added, and the mixture was stirred in an argon atmosphere at 50° C. for 50 hours, and then, 80° C. for 14 hours, 110° C. for 24 hours, and 140° C. for 24 hours, sequentially. As a result, polyimide 4b having a number average molecular weight of 6400 was obtained with a yield of 56%. In this process, production of the target PAA (polyamic acid) intermediate and PI (polyimide) was confirmed after each reaction time.

Polyimide 4b $^1$H NMR (500 MHz, $CDCl_3$) δ=8.05; (2H, d, J=8.3 Hz), 7.61-7.55; (5H, m), 7.43; (2H, s), 7.34; (1H, d, J=7.7 Hz), 2.24-2.21; (12H, m).

$^{19}$F NMR (471 MHz, $CDCl_3$) δ=−105.3; (2F, s), −111.2; (2F, s), −120.9; (2F, s), −121.3-−121.6; (4F, m), −122.0; (2F, s).

Example 6

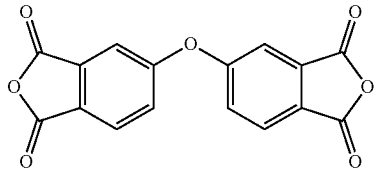

+

3

-continued

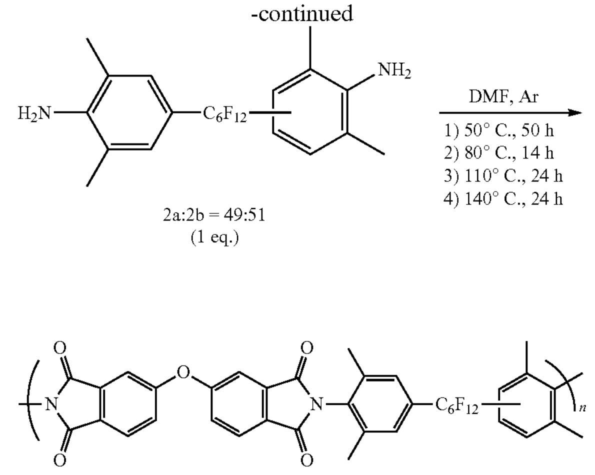

2a:2b = 49:51
(1 eq.)

4ab: 62%
$M_n^{b,c)} = 8.4 \times 10^3$, $M_w/M_n^{b,c)} = 1.93$

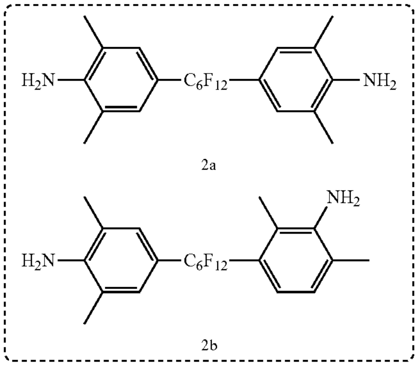

2a

2b

| 2a (conv.)[a] | | 2b (conv.)[a] | |
|---|---|---|---|
| AA | ｲﾐﾄﾞ | AA | Imide |
| 1) 34% | 1% | 1) 78% | 11% |
| 2) 42% | 7% | 2) 59% | 29% |
| 3) 30% | 17% | 3) 0% | 89% |
| 4) 0% | 87% | 4) 0% | 100% |

a) Determined by 19F NMR
b) Insoluble in hexane
c) Determined by GPC (THF, with linear polystyrene as reference substance)

To a 4,4'-oxydiphthalic anhydride (3) (0.25 mmol, 77.5 mg) solution in DMF (20 wt %), an equimolar amount of a mixture of diamine compounds (2a:2b=49:51) was added, and the mixture was stirred in an argon atmosphere at 50° C. for 50 hours, and then, 80° C. for 14 hours, 110° C. for 24 hours, and 140° C. for 24 hours, sequentially. As a result, polyimide 4ab having a number average molecular weight of 8400 was obtained with a yield of 62% (entry 2). In this process, production of the target PAA (polyamic acid) intermediate and PI (polyimide) was confirmed after each reaction time.

Polyimide 4ab $^1$H NMR (500 MHz, $CDCl_3$) δ=8.05; (d, J=8.3 Hz), 7.61-7.55; (m), 7.43 (s), 7.34; (d, J=7.7 Hz), 2.24-2.21; (12H, m).

$^{19}$F NMR (471 MHz, $CDCl_3$) δ=−105.3; (s), −111.2; (s), −120.9; (s), −121.3–−121.6; (m), −122.0; (s).

Example 7

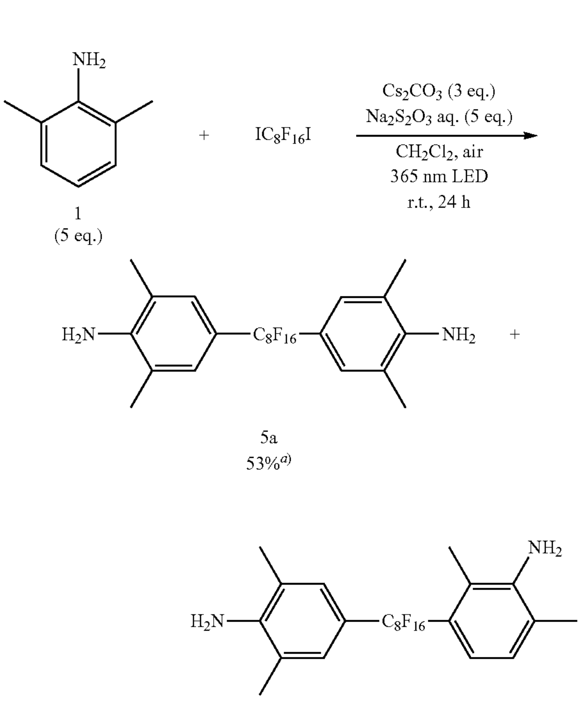

1
(5 eq.)

5a
53%[a)]

5b
17%[a)]

a) Determined by 19F NMR

To a perfluoro-1,8-diiodooctane (0.3 mmol, 191.4 mg) solution in dichloromethane (2.5 mL), 5 equivalents of 2,6-xylidine (1), 3 equivalents of cesium carbonate, and 5 equivalents of sodium thiosulfate aqueous solution (2 mL) were added, and the mixture was irradiated with light for 24 hours using LED of a wavelength 365 nm in atmospheric air.

As a result, the target diamine compound 5a and 5b were obtained with yields of 53% and 17%, respectively.

Diamine Compound 5a $^1$H NMR (500 MHz, $CDCl_3$) δ=7.13; (4H, s), 3.87; (4H, br s), 2.20; (12H, s). $^{19}$F NMR (471 MHz, $CDCl_3$) δ=−109.7; (4F, s), −121.8; (4F, s), −122.3; (8F, s).

$^{13}$C NMR (150 MHz, $CDCl_3$) δ=146.0, 126.7, 121.0, 117.4; (t, J=24.0 Hz), 17.7.

Diamine Compound 5b $^1$H NMR (500 MHz, $CDCl_3$) δ=7.14; (2H, s), 7.04; (1H, d, J=8.0 Hz), 6.93; (1H, d, J=8.0 Hz), 3.81; (4H, br s), 2.22-2.21; (12H, m).

$^{19}$F NMR (471 MHz, $CDCl_3$) δ=−104.5; (2F, s), −109.7; (2F, s), −121.0; (2F, s), −121.8; (2F, s), −122.0; (2F, s), −122.3; (6F, s).

$^{13}$C NMR (150 MHz, $CDCl_3$) δ=146.0, 144.1, 127.6, 126.7, 125.5, 121.0, 117.9, 117.4; (t, J=24.0 Hz), 18.1, 17.7, 14.0.

Example 8

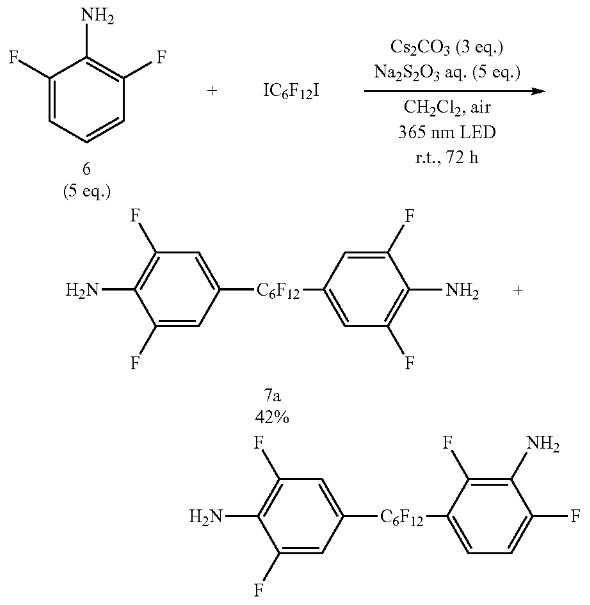

6
(5 eq.)
7a
42%
7b
11%

To a dodecafluoro-1,6-diiodohexane (0.3 mmol) solution in dichloromethane (2.5 mL), 10 equivalents of 2,6-difluoroaniline (6), 3 equivalents of cesium carbonate, and 5 equivalents of sodium thiosulfate aqueous solution (2 mL) were added, and the mixture was irradiated with light using LED of a wavelength 365 nm for 72 hours in atmospheric air. As a result, the target diamine compound 7a and 7b were obtained with yields of 42% and 11%, respectively.

Diamine Compound 7a $^1H$ NMR (500 MHz, $CDCl_3$) δ=7.07; (4H, dd, J=6.7, 1.9 Hz), 4.07; (4H, br s).

$^{19}F$ NMR (471 MHz, $CDCl_3$) δ=−109.9; (4F, s), −121.9; (4F, s), −122.5; (4F, s), −131.8; (4F, s).

Diamine Compound 7b $^1H$ NMR (500 MHz, $CDCl_3$) δ=7.07; (2H, dd, J=6.7, 1.9 Hz), 6.92; (1H, t, J=9.3 Hz), 6.86-6.84; (1H, m), 4.07; (2H, br s), 3.90; (2H, br s).

$^{19}F$ NMR (471 MHz, $CDCl_3$) δ=−109.3; (2F, s), −109.9; (2F, s), −121.9; (2F, s), −122.2; (2F, s), −122.5; (2F, s), −122.5; (2F, s), −126.0; (1F, s), −131.0; (1F, s), −131.8; (2F, s).

Example 9

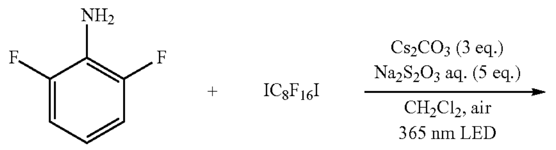

6
(5 eq.)

-continued

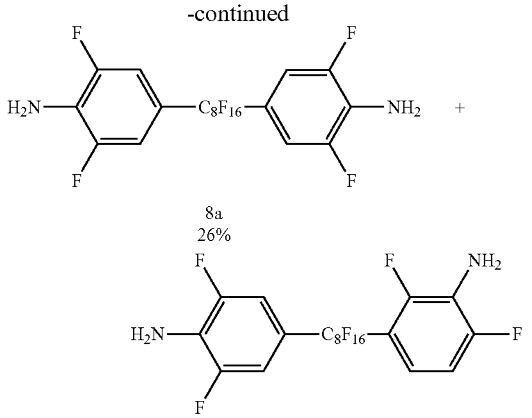

8a
26%
8b
12%[a)]

To a perfluoro-1,8-diiodooctane (0.6 mmol, 163.3 mg) solution in dichloromethane (5 mL), 5 equivalents of 2,6-difluoroaniline (6×), 3 equivalents of cesium carbonate, and 5 equivalents of sodium thiosulfate aqueous solution (4 mL) were added, and the mixture was irradiated with light using LED of a wavelength 365 nm for 72 hours in atmospheric air. As a result, the target diamine compound 8a and 8b were obtained with yields of 26% and 12%, respectively.

Diamine Compound 8a $^1H$ NMR (500 MHz, $CDCl_3$) δ=7.07; (4H, dd, J=6.6, 2.0 Hz), 4.08; (4H, br s).

$^{19}F$ NMR (471 MHz, $CDCl_3$) δ=−109.9; (4F, s), −121.8; (4F, s), −122.4; (8F, s), −131.7; (4F, s).

Diamine Compound 8b $^1H$ NMR (500 MHz, $CDCl_3$) δ=7.07; (2H, dd, J=6.6, 1.7 Hz), 6.93; (1H, t, J=9.6 Hz), 6.87-6.84; (1H, m), 4.08; (2H, br s), 3.91; (2H, br s).

$^{19}F$ NMR (471 MHz, $CDCl_3$) δ=−109.3; (2F, s), −109.9; (2F, s), −121.8; (2F, s), −122.1; (2F, s), −122.4; (12F, s), −125.9; (1F, s), −131.0; (1F, s), −131.7; (2F, s).

Example 10

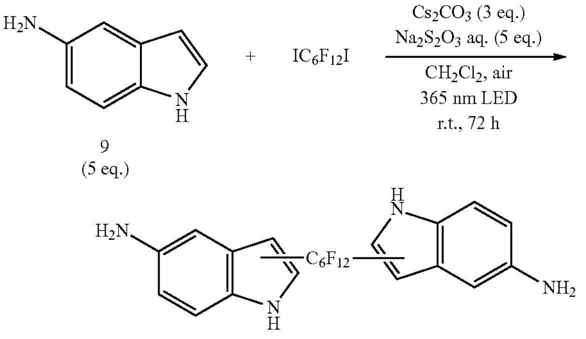

9
(5 eq.)
26%

-continued

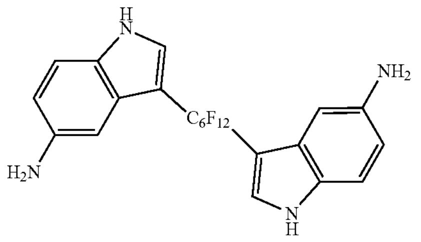

major
19%

To a perfluoro-1,6-diiodohexane (0.3 mmol, 159.6 mg) solution in dichloromethane (2.5 mL), 5 equivalents of 5-aminoindole (9), 3 equivalents of cesium carbonate, and 5 equivalents of sodium thiosulfate aqueous solution (2 mL) were added, and the mixture was irradiated with light using LED of a wavelength 365 nm for 48 hours in atmospheric air. As a result, the target diamine compound was obtained with a yield of 26%.

Diamine Compound

$^1$H NMR (500 MHz, $CDCl_3$) δ=8.08; (2H, br s), 7.31; (2H, d, J=8.6 Hz), 7.16; (2H, t, J=2.9 Hz), 6.60; (2H, d, J=8.6 Hz), 6.56; (2H, s), 4.03; (4H, br s).

$^{19}$F NMR (471 MHz, $CDCl_3$) δ=−106.1; (4H, s), −122.1; (4H, s), −122.4; (4H, s).

Example 11 (Synthesis of Diethyl Monomer)

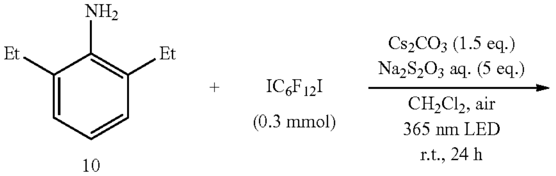

10
(5 eq.)

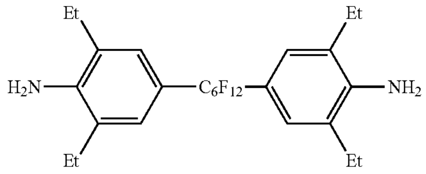

11
50%

To a dodecafluoro-1,6-diiodohexane (0.3 mmol) solution in dichloromethane (2.5 mL), 5 equivalents of 2,6-diethylaniline (10), 1.5 equivalents of cesium carbonate, and 5 equivalents of sodium thiosulfate aqueous solution (2 mL) were added, and the mixture was irradiated with light using LED of a wavelength 365 nm for 24 hours in atmospheric air. As a result, the target diamine compound 11 was obtained with a yield of 50%.

Diamine Compound 11

$^1$H NMR (500 MHz, $CDCl_3$) δ=7.15; (4H, s, PhH), 3.93; (4H, br s, $PhNH_2$), 2.54; (8H, q, J=7.5, $PhCH_2CH_3$), 1.27; (12H, t, J=7.6, $PhCH_2CH_3$).

$^{19}$F NMR (471 MHz, $CDCl_3$) δ=−109.7; (4F, s, $PhCF_2$), −121.9; (4F, s, $CF_2$), −122.3; (4F, s, $CF_2$)

Example 12 (Synthesis of Dichloro Monomer)

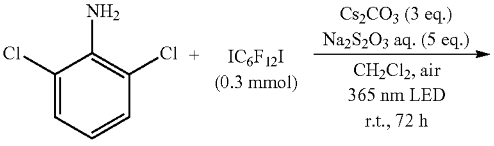

12
(5 eq.)

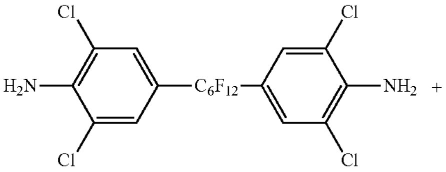

13a
(73%)

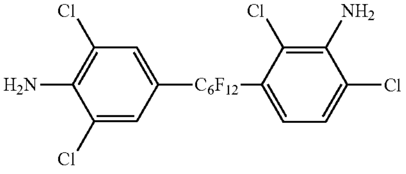

13b
(27%)

To a dodecafluoro-1,6-diiodohexane (0.3 mmol) solution in dichloromethane (2.5 mL), 5 equivalents of 2,6-dichloroaniline (12), 3 equivalents of cesium carbonate, and 5 equivalents of sodium thiosulfate aqueous solution (2 mL) were added, and the mixture was irradiated with light using LED of a wavelength 365 nm for 72 hours in atmospheric air. As a result, the target diamine compounds 13a:13b were obtained in a production ratio of 73:27.

Diamine Compound 13a (p-p Form)

[1]NMR (500 MHz, $CDCl_3$) δ=7.39; (4H, s, PhH), 4.80; (4H, br s, $PhNH_2$).

$^{19}$F NMR (471 MHz, $CDCl_3$) δ=−110.1; (4F, s, $PhCF_2$), −121.8; (4F, s, $CF_2$), −122.1; (4F, s, $CF_2$)

Diamine Compound 13b (p-m Form)

$^1$H NMR (500 MHz, $CDCl_3$) δ=7.39; (2H, s, PhH), 7.29; (1H, d, J=8.6 Hz, PhH), 6.92; (1H, d, J=8.6 Hz, PhH), 4.80; (2H, br s, $PhNH_2$), 4.74; (2H, br s, $PhNH_2$).

$^{19}$F NMR (471 MHz, $CDCl_3$) δ=−107.2; (2F, s, $PhCF_2$), −110.1; (2F, s, $PhCF_2$), −120.5; (2F, s, $CF_2$), −121.8; (2F, s, $CF_2$), −122.1; (4F, s, $CF_2$)

Example 13

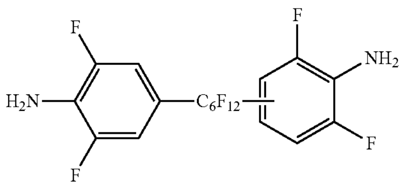

7

+

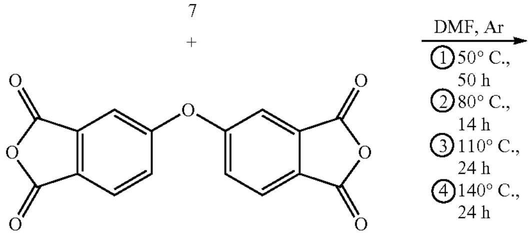

3

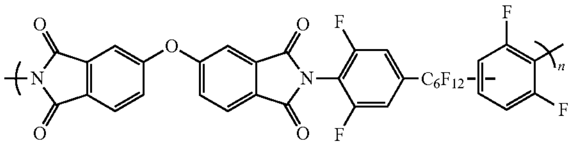

14: 50%

$M_n = 1.5 \times 10^3$, $M_w/M_n = 1.5$

To a 4,4'-oxydiphthalic anhydride (3) (0.13 mmol, 41.2 mg) solution in DMF (20 wt %), an equimolar amount of diamine compound (7) was added, and the mixture was stirred in an argon atmosphere at 50° C. for 50 hours, and then, 80° C. for 14 hours, 110° C. for 24 hours, and 140° C. for 24 hours, sequentially. As a result, polyimide 14 having a number average molecular weight of $1.3\times10^4$ was obtained with a yield of 50%. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 14

$^{19}$F NMR (471 MHz, $CDCl_3$) δ=−111.4; (4F, s), −122.1; (8F, s), −132.0; (4F, s)

Example 14

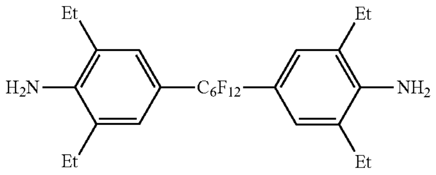

11

+

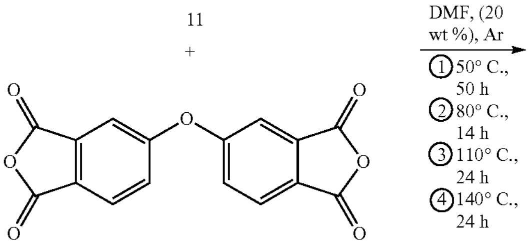

3

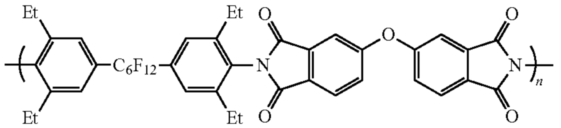

15: 85%

$M_n = 3.7 \times 10^3$, $M_w/M_n = 1.19$ (183.3 mg)

To a 4,4'-oxydiphthalic anhydride (3) (0.25 mmol, 76.7 mg) solution in DMF (20 wt %), an equimolar amount of diamine compound (11) was added, and the mixture was stirred in an argon atmosphere at 50° C. for 50 hours, and then, 80° C. for 14 hours, 110° C. for 24 hours, and 140° C. for 24 hours, sequentially. As a result, polyimide 15 having a number average molecular weight of $3.7\times10^3$ was obtained with a yield of 85%. The product was dissolved in DMF, and the resultant was applied to a quartz plate by spin-coating and heat-treated at 70° C. for 0.5 hours and at 260° C. for 1.5 hours, to thereby obtain a light yellow transparent polyimide film.

Polyimide 15

$^{1}$H NMR (500 MHz, $CDCl_3$) δ=8.06; (2H, d, J=8.0), 7.59-7.56; (4H, m), 7.48; (4H, s), 2.57-52; (8H, m), 1.21-1.17; (12H, m).

$^{19}$F NMR (471 MHz, $CDCl_3$) δ=−111.2; (4F, s), −121.7; (8F, s).

Example 15

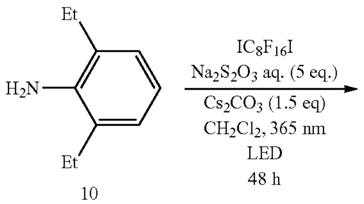

10

-continued

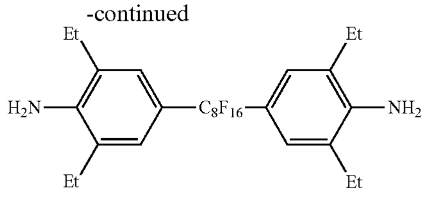

16a

+

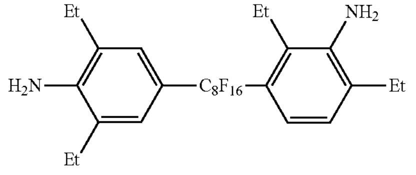

16b

To a 1,8-diiodoperfluorooctane (0.6 mmol, 784.2 mg) solution in dichloromethane (4 mL), 5 equivalents of 2,6-diethylaniline (897.0 mg), 5 equivalents of sodium thiosulfate aqueous solution (947.2 mg in 4 mL of water), and 1.5 equivalents of cesium carbonate (587.4 mg) were added, and the mixture was irradiated with light using LED of a wavelength 365 nm for 48 hours in atmospheric air. As a result, the target diamine compounds 16a and 16b were obtained with NMR yields of 71% and 5%, respectively.

Diamine Compound 16a

$^1$H NMR (500 MHz, $CDCl_3$) δ=7.15; (4H, s), 3.94; (4H, s), 2.54; (8H, q, J=7.4), 1.28; (12H, t, J=7.6).

$^{19}$F NMR (471 MHz, $CDCl_3$) δ=−109.7; (4F, s), −121.8; (4F, s), −122.3; (4F, s), −122.3; (4F, s)

Diamine Compound 16b

$^{19}$F NMR (471 MHz, $CDCl_3$) δ=−104.2; (2F, s), −109.7; (2F, s), −121.7; (2F, s), −121.8; (4F, s), −122.3; (6F, s)

Example 16

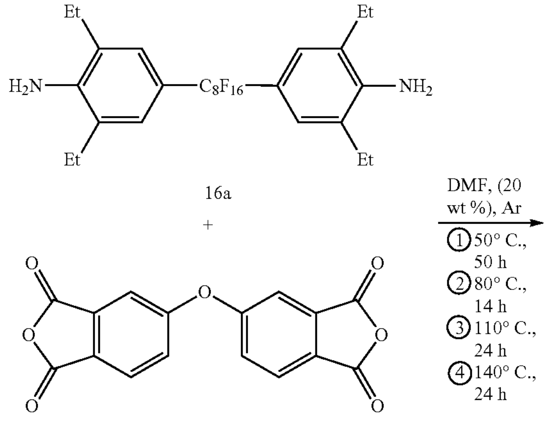

16a

+

3

-continued

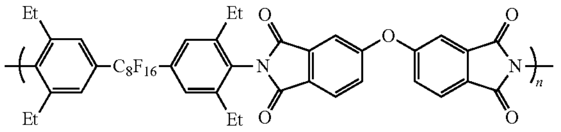

17: 73%

$M_n = 5.2 \times 10^3$, $M_w/M_n = 1.34$ (162.4 mg)

To a 4,4'-oxydiphthalic anhydride (3) (0.23 mmol, 69.9 mg) solution in DMF (20 wt %), an equimolar amount of diamine compound (16a) was added, and the mixture was stirred in an argon atmosphere at 50° C. for 50 hours, and then, 80° C. for 14 hours, 110° C. for 24 hours, and 140° C. for 24 hours, sequentially. As a result, polyimide 17 having a number average molecular weight of $5.2\times10^3$ was obtained with a yield of 73%. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 17

$^1$H NMR (500 MHz, $CDCl_3$) δ=8.06; (2H, d, J=8.0), 7.59-7.57; (4H, m), 7.47 (4H, s), 2.57-52; (8H, m), 1.21-1.17; (12H, m).

$^{19}$F NMR (471 MHz, $CDCl_3$) δ=−111.0; (4F, s), −121.7; (8F, s).

Example 17

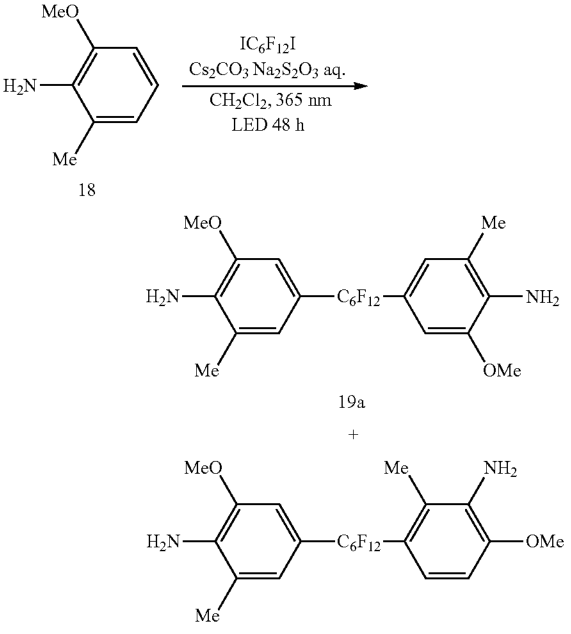

18

19a

+

19b

+

-continued

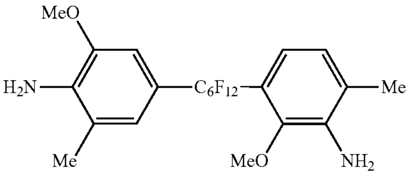

19c

To a 1,6-diiodoperfluorohexane (0.6 mmol, 140 μL) solution in dichloromethane (5 mL), 5 equivalents of 2-methoxy, 6-methylaniline (411 mg), 5 equivalents of sodium thiosulfate aqueous solution (474 mg in 4 mL of water), and 1.5 equivalents of cesium carbonate (587.4 mg) were added, and the mixture was irradiated with light using LED of a wavelength 365 nm for 48 hours in atmospheric air. As a result, the target diamine compound 19a and a mixture of the target diamine compounds 19b and 19c were obtained with yields of 68% and 21%, respectively.

Diamine Compound 19a $^1$H NMR (500 MHz, $CDCl_3$) δ=6.94; (2H, s), 6.83; (2H, s), 4.04; (4H, br s), 3.87; (6H, s), 2.20; (6H, s).

$^{19}$F NMR (471 MHz, $CDCl_3$) δ=−109.4; (4F, s), −121.9; (4F, s), −122.3; (4F, s).

Mixture of Diamine Compounds 19b and 19c $^1$H NMR (500 MHz, $CDCl_3$) δ=6.98; (1H, d, J=9.2), 6.74; (1H, d, J=9.2), 4.04; (4H, br s), 3.89; (6H, s), 2.22; (6H, s).

$^{19}$F NMR (471 MHz, $CDCl_3$) δ=−104.0; (2F, s), −109.4; (2F, s), −121.0; (2F, s) −121.9; (2F, s), −122.3; (4F, s).

Example 18

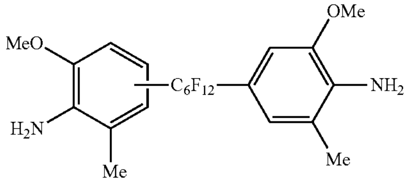

19
19a:19b&c = 1:0.39
286.1 mg (0.50 mmol)

+

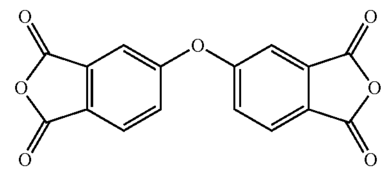

3
155.1 mg
(1 eq.)

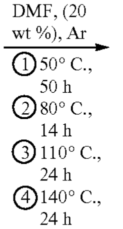

-continued

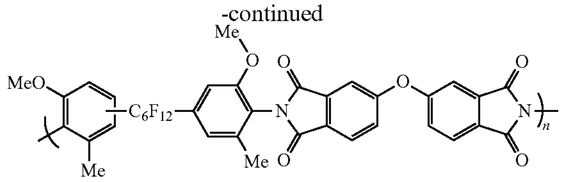

20: 79%
$M_n = 4.6 \times 10^3$, $M_w/M_n = 2.31$
(334.8 mg)

To a 4,4'-oxydiphthalic anhydride (3) (0.50 mmol, 155.1 mg) solution in DMF (20 wt %), an equimolar amount of diamine compound (19) was added, and the mixture was stirred in an argon atmosphere at 50° C. for 50 hours, and then, 80° C. for 14 hours, 110° C. for 24 hours, and 140° C. for 24 hours, sequentially. As a result, polyimide 20 having a number average molecular weight of $4.6\times10^3$ was obtained with a yield of 79%. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 20

$^1$H NMR (500 MHz, $CDCl_3$) δ=8.03; (2H, d, J=6.6), 7.57-7.52; (4H, m), 7.21; (2H, s), 7.05; (2H, s), 3.83-3.82; (6H, m), 2.29-2.27; (6H, m).

$^{19}$F NMR (471 MHz, $CDCl_3$) δ=−115.4; (4F, s), −127.6; (8F, s).

Example 19

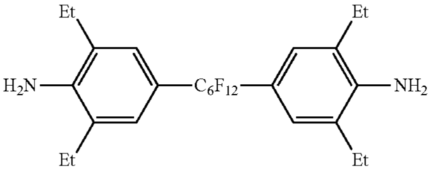

11

+

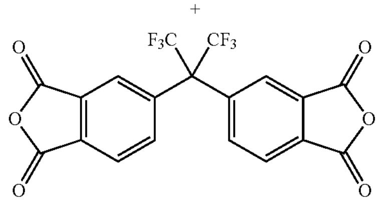

21

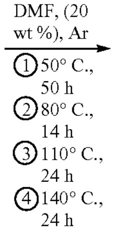

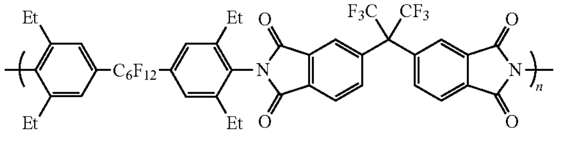

22: 60%
$M_n = 2.5 \times 10^3$, $M_w/M_n = 2.39$
(160.6 mg)

To a 4,4'-(hexafluoroisopropylidene)diphthalic anhydride 21 [common name: 6FDA] (0.27 mmol, 117.0 mg) solution in DMF (20 wt %), an equimolar amount of diamine compound (11) was added, and the mixture was stirred in an argon atmosphere at 50° C. for 50 hours, and then, 80° C. for 14 hours, 110° C. for 24 hours, and 140° C. for 24 hours, sequentially. As a result, polyimide 22 having a number average molecular weight of $2.5\times10^3$ was obtained with a yield of 60%. The product was dissolved in DMF, and the resultant was applied to a quartz plate by spin-coating and heat-treated at 70° C. for 0.5 hours and 260° C. for 1.5 hours, to thereby obtain a light yellow transparent polyimide film. The polyimide film was insoluble in AK-225 (1 mol/L).

Polyimide 22

$^1H$ NMR (500 MHz, $CDCl_3$) δ=8.09; (2H, d, J=8.2), 7.99; (4H, m), 7.49; (4H, s), 2.54; (8H, m), 1.20; (12H, t, J=7.6).

$^{19}F$ NMR (471 MHz, $CDCl_3$) δ=−63.6; (6F, s), −111.3; (4F, s), −121.8; (8F, s).

Example 20

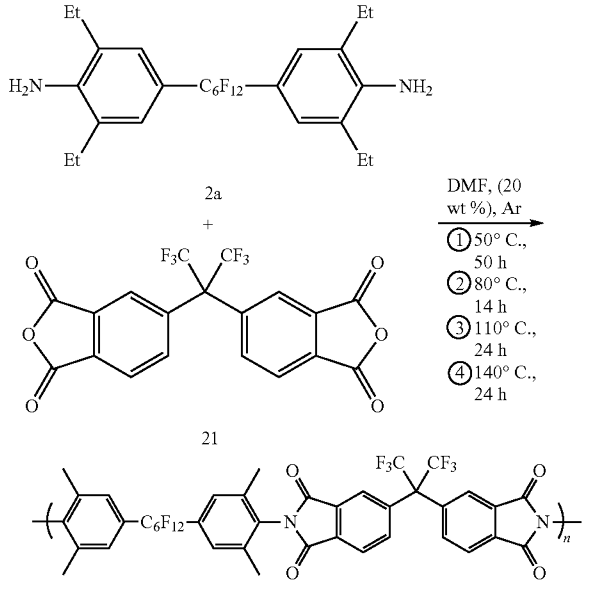

2a

21

23: 95%

$M_n = 6.3 \times 10^3$, $M_w/M_n = 6.35$

To a 4,4'-(hexafluoroisopropylidene)diphthalic anhydride 21 [common name: 6FDA] (0.199 mmol, 88.5 mg) solution in DMF (20 wt %), an equimolar amount of diamine compound (2a) was added, and the mixture was stirred in an argon atmosphere at 50° C. for 50 hours, and then, 80° C. for 14 hours, 110° C. for 24 hours, and 140° C. for 24 hours, sequentially. As a result, polyimide 23 having a number average molecular weight of $6.3\times10^3$ was obtained with a yield of 95%.

Polyimide 23

$^1H$ NMR (500 MHz, $CDCl_3$) δ=8.09; (2H, d, J=7.8), 7.99; (4H, m), 7.45; (4H, s), 2.27; (12H, s).

$^{19}F$ NMR (471 MHz, $CDCl_3$) δ=−63.6; (6F, s), −111.3; (4F, s), −121.7; (8F, s).

Example 21

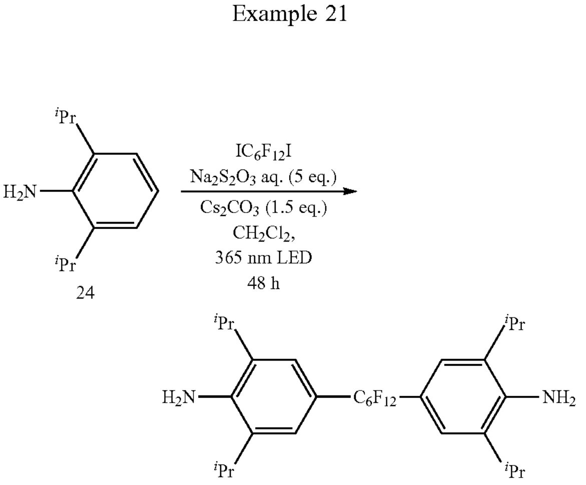

24

25

To a dodecafluoro-1,6-diiodohexane (1.0 mmol) solution in a mixture of acetonitrile/water (25/5 mL), 6 equivalents of 2,6-diisopropylaniline (24), 10 mol % of eosin Y-2Na, 2.5 equivalents of cesium carbonate, and 4 equivalents of ascorbic acid (2 mL) were added, and the mixture was irradiated with light for 24 hours using white LED in an argon atmosphere. As a result, the target diamine compound 25 was obtained with a yield of 68%.

Diamine Compound 25

$^1H$ NMR (500 MHz, $CDCl_3$) δ=7.19; (4H, s), 4.02; (4H, br s), 2.90; (2H, m), 1.28; (6H, d, J=6.9).

$^{19}F$ NMR (471 MHz, $CDCl_3$) δ=−109.8; (4F, s), −121.9; (4F, s), −122.3; (4F, s).

Example 22

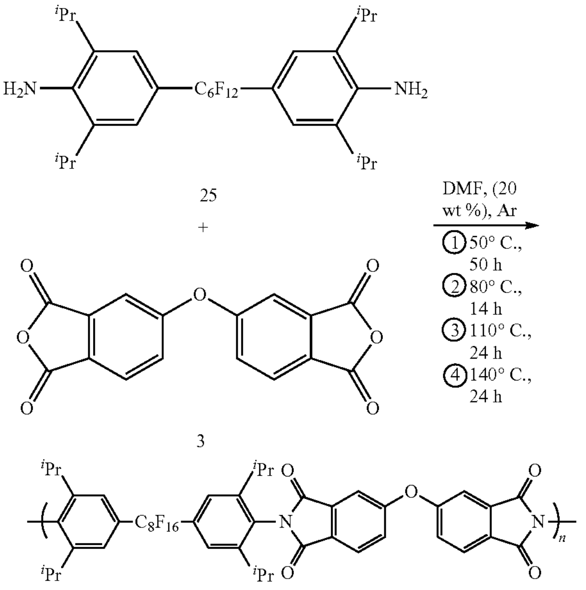

25

3

26

To a 4,4'-oxydiphthalic anhydride (3) (0.50 mmol, 155.9 mg) solution in DMF (50 wt %), an equimolar amount of diamine compound (25) was added, and the mixture was stirred in an argon atmosphere at 50° C. for 50 hours, and then, 80° C. for 14 hours, 110° C. for 24 hours, and 140° C. for 24 hours, sequentially. As a result, polyimide 6 having a number average molecular weight of $2.3\times10^4$ was obtained. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 25

$^1$H NMR (500 MHz, $CDCl_3$) δ=8.07; (2H, d, J=9.2), 7.60; (4H, m), 7.51; (4H, s), 7.40; (4H, d, J=7.3), 2.79; (4H, m), 1.21; (24H, m).

$^{19}$F NMR (471 MHz, $CDCl_3$) δ=−111.5; (4F, s), −121.9; (8F, s).

Example 23

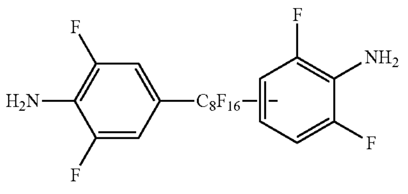

8

+

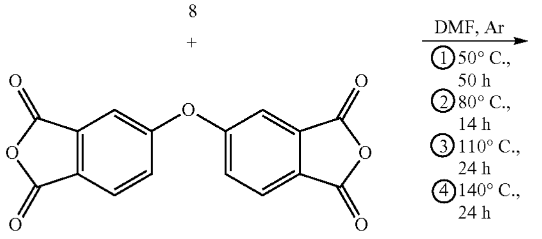

3

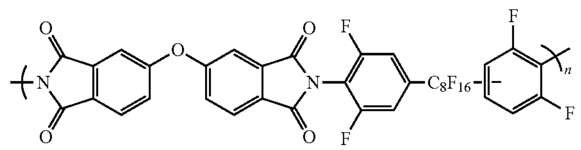

27

To a 4,4'-oxydiphthalic anhydride (3) (0.50 mmol, 155.8 mg) solution in DMF (50 wt %), an equimolar amount of diamine compound (8) was added, and the mixture was stirred in an argon atmosphere at 50° C. for 50 hours, and then, 80° C. for 14 hours, 110° C. for 24 hours, and 140° C. for 24 hours, sequentially. As a result, polyimide 27 having a number average molecular weight of $5.3\times10^3$ was obtained. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Example 24

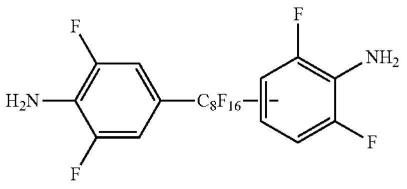

8

+

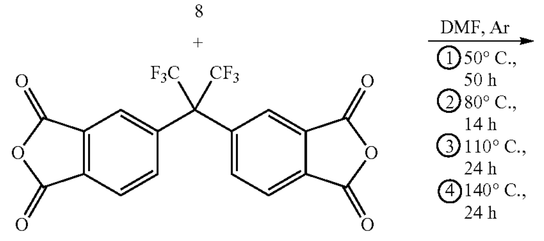

21

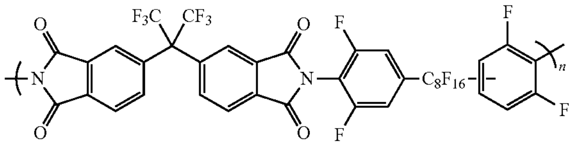

28

To a 4,4'-(hexafluoroisopropylidene)diphthalic anhydride 21 [common name: 6FDA] (0.51 mmol, 225.4 mg) solution in DMF (50 wt %), an equimolar amount of diamine compound (8) was added, and the mixture was stirred in an argon atmosphere at 50° C. for 50 hours, and then, 80° C. for 14 hours, 110° C. for 24 hours, and 140° C. for 24 hours, sequentially. As a result, polyimide 28 having a number average molecular weight of $6.7\times10^3$ was obtained with a yield. The product was dissolved in DMF, and the resultant was applied to a quartz plate by spin-coating and heat-treated at 70° C. for 0.5 hours and 260° C. for 1.5 hours, to thereby obtain a light yellow transparent polyimide film.

Polyimide 28

$^1$H NMR (500 MHz, $CDCl_3$) δ=8.11; (2H, d, J=8.2), 8.01; (2H, s), 7.93; (2H, d, J=8.2), 7.40; (4H, d, J=7.3).

$^{19}$F NMR (471 MHz, $CDCl_3$) δ=−63.6; (6F, s), −111.3; (4F, s), −112.3; (4F, s), −121.7; (6F, s), 122.2; (6F, s).

Example 25

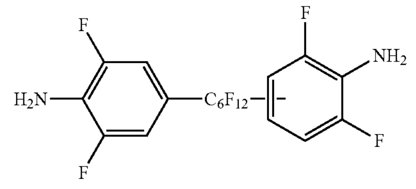

7

+

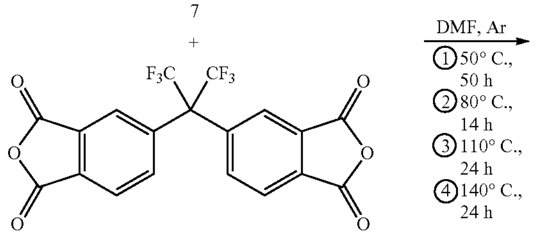

21

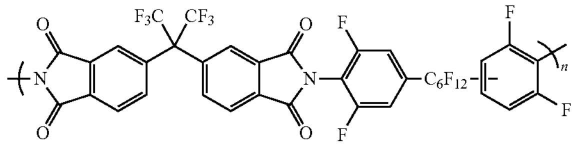

29

$M_n = 6.1 \times 10^3$

To a 4,4'-(hexafluoroisopropylidene)diphthalic anhydride 21 [common name: 6FDA] (0.50 mmol, 223.0 mg) solution in DMF (50 wt %), an equimolar amount of diamine compound (7) was added, and the mixture was stirred in an argon atmosphere at 50° C. for 50 hours, and then, 80° C. for 14 hours, 110° C. for 24 hours, and 140° C. for 24 hours, sequentially. As a result, polyimide 29 having a number average molecular weight of $6.1\times10^3$ was obtained. The product was dissolved in DMF, and the resultant was applied to a quartz plate by spin-coating and heat-treated at 70° C. for 0.5 hours and 260° C. for 1.5 hours, to thereby obtain a light yellow transparent polyimide film. The polyimide film was soluble completely in AK-225 (1 mol/L). It was considered that this solubility was exhibited due to fluorine atoms on aromatic rings, as compared with Example 19.

Polyimide 29

$^1$H NMR (500 MHz, $CDCl_3$) δ=8.11; (2H, d, J=7.8), 8.03; (2H, s), 7.93; (2H, d, J=7.8), 7.40; (4H, d, J=6.9).

$^{19}$F NMR (471 MHz, $CDCl_3$) δ=−63.7; (6F, s), −111.3; (4F, s), −112.4; (4F, s), −121.7; (8F, s).

Comparative Example 1

30

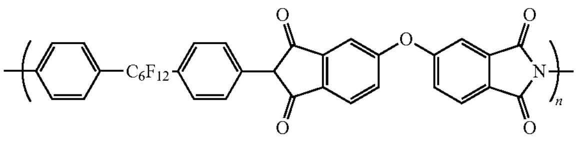

Reference was made to Polymer Preprints, Japan vol. 69, No. 2 (2020) 3R05 for values of physical properties and characteristics of polyimide 30 described above.

Comparative Example 2

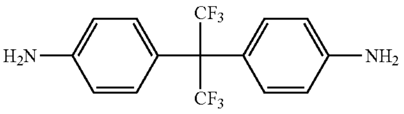

31

+

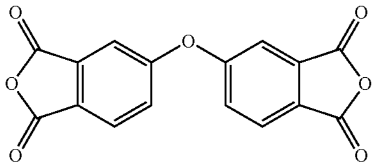

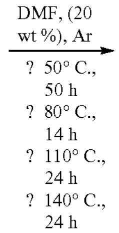

3

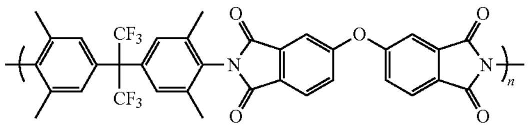

32

Soluble Part in THF: 10%, $M_n = 4.9 \times 10^3$, $M_w/M_n = 1.51$

Insoluble Part in THF: 21%, Determination of molecular weight was impossible

To a 4,4'-oxydiphthalic anhydride (3) (0.300 mmol, 93.0 mg) solution in DMF (20 wt %), 2,2'-bis(4-aminophenyl-hexafluoropropane) 31 (0.300 mmol, 100.0 mg) was added, and the mixture was stirred in an argon atmosphere at 50° C. for 50 hours, and then, 80° C. for 14 hours, 110° C. for 24 hours, and 140° C. for 24 hours, sequentially. After the completion of the reaction, it was found by visual observation that there was a polymer that was insoluble in DMF as the reaction medium and thus deposited. The medium was distilled off from the resulting reaction mixture. When THF (tetrahydrofuran) was added, part of the polymer was dissolved. The component soluble in THF and that insoluble in THF were purified by reprecipitation and washing, respectively, so that polyimide 32 that was soluble in THF and polyimide 32 that was insoluble in THF were obtained with yields of 10% and 21%, respectively. The number average molecular weight of the component soluble in THF was measured by GPC and found to be $4.9\times10^3$.

The values of various physical properties of the compounds obtained in Examples are collectively shown in the table below.

TABLE 1

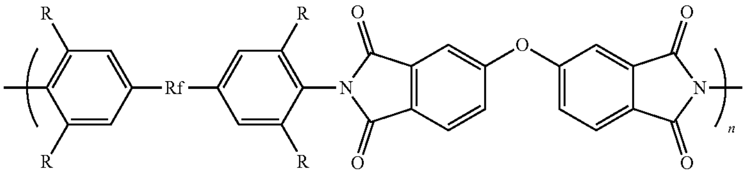

| | R | Rf | Solubility (DMF) (THF) | Appearance of Film | Refractive Index (n) (@588 nm) | Refractive Index (n) (@636 nm) | Refractive Index (n) (@845 nm) | Refractive Index (n) (@1310 nm) | Refractive Index (n) (@1558 nm) | Dielectric Constant (ε) |
|---|---|---|---|---|---|---|---|---|---|---|
| Example 4 | $CH_3$ | $C_6F_{12}$ | Good | Light Yellow, Transparent | — | — | 1.529 | 1.521 | 1.519 | — |
| Example 14 | $CH_3CH_2$ | $C_6F_{12}$ | Good | Light Yellow, Transparent | 1.547 | 1.542 | 1.530 | 1.522 | 1.520 | 2.63 |
| Example 16 | $CH_3CH_2$ | $C_8F_{16}$ | Good | Light Yellow, Transparent | — | — | — | 1.511 | 1.510 | — |
| Comparative Example 1 | H | $C_6F_{12}$ | — | White Turbid, Opaque | 1.573 | — | — | — | — | 2.72 |
| Comparative Example 2 | H | $C(CF_3)_2$ | poor | Colorless, Transparent | 1.599 | 1.592 | 1.584 | 1.570 | 1.569 | 2.81 |

Evaluation

Preparation of Film

The polyimide obtained in each Example was dissolved in DMF (1 mL). The resulting solution was dropped on a quartz plate and applied thereto using a spin coater, and then heat-treated was performed at 70° C. for 0.5 hours and 260° C. for 1.5 hours to thereby prepare a polyimide film.

Measurement of Refractive Index n

On a thin film obtained by firing on a silicon substrate, the measurements of TE and TM were carried out at measurement wavelengths of 633, 850, 1550, and 3120 nm using a prism Coupler (METRICON PC-2010).

Calculation of Dielectric Constant

The dielectric constant was calculated using the following formula.

$$\text{Dielectric Constant } \varepsilon = 1.1 \times [\text{Refractive Index n (@588 nm)}]^2$$

Industrial Applicability

The polyimide compound of the present disclosure can be used in a wide variety of applications including automobile components, aircraft components, and electrical and electronic components.

The invention claimed is:

1. A polyimide compound represented by formula (I):

$$-\!\!\left(Ar^1 - A^1 - Ar^2 - A^2\right)_{n1}\!\!-$$

wherein $Ar^1$ is a group represented by the following formula:

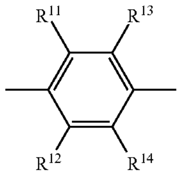

or an indolylene group optionally substituted with one or more substituents, $Ar^2$ is a group represented by the following formula:

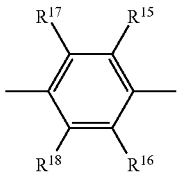

or an indolylene group optionally substituted with one or more substituents, $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^2$ is an aliphatic or aromatic bisimide-N',N-diyl, and n1 is any integer.

2. The polyimide compound according to claim 1, wherein $Ar^1$ and $Ar^2$ are each a phenylene group substituted with one or more substituents each selected from a $C_{1-6}$ alkyl group, a $C_{1-6}$ alkoxy group, and a halogen atom.

3. The polyimide compound according to claim 1, wherein formula (I) is formula (Ia'):

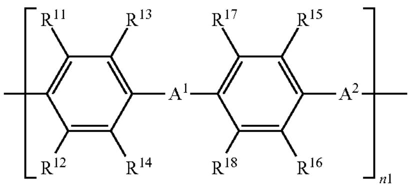

wherein $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^2$ is an aliphatic or aromatic bisimide-N',N-diyl, and n1 is any integer.

4. The polyimide compound according to claim 3, wherein $R^{11}$ and $R^{12}$ are each a $C_{1-6}$ alkyl group, a $C_{1-6}$ alkoxy group, or a halogen atom, $R^{15}$ and $R^{16}$ are each a $C_{1-6}$ alkyl group, a $C_{1-6}$ alkoxy group, or a halogen atom, and $R^{13}$, $R^{14}$, $R^{17}$, and $R^{18}$ are each a hydrogen atom.

5. The polyimide compound according to claim 1, wherein $Ar^1$ and $Ar^2$ are each an indolylene group optionally substituted with one or more substituents each selected from a $C_{1-6}$ alkyl group, a $C_{1-6}$ alkoxy group, and a halogen atom.

6. The polyimide compound according to claim 1, wherein formula (I) is formula (Ic):

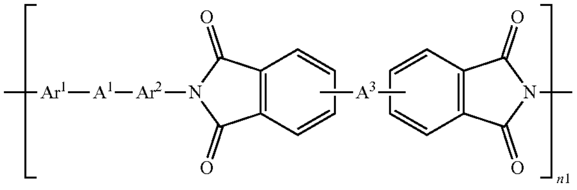

wherein $Ar^1$ is a group represented by the following formula:

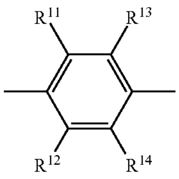

or an indolylene group optionally substituted with one or more substituents, $Ar^2$ is a group represented by the following formula:

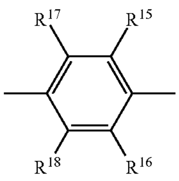

or an indolylene group optionally substituted with one or more substituents, $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^3$ is a single bond or a divalent organic group, and n1 is any integer.

7. The polyimide compound according to claim 6, wherein $A^3$ is a single bond, a linear or branched $C_{1-16}$ alkylene group optionally substituted with a fluorine atom, an oxygen atom, —CO—, —C≡C—, —$SO_2$—,

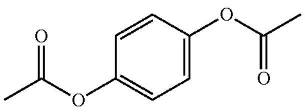

or

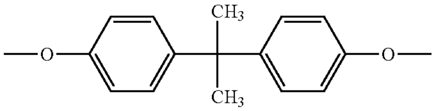

.

8. The polyimide compound according to claim 1, wherein $A^2$ is any one of the following groups:

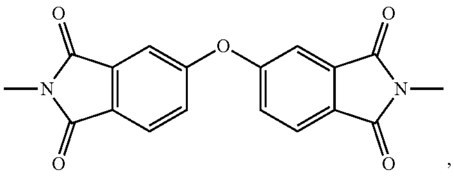

,

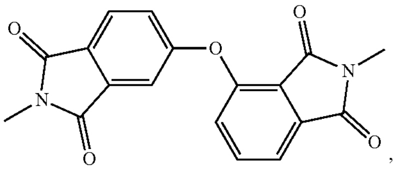

,

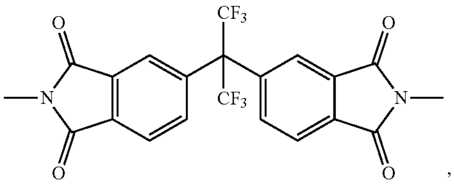

,

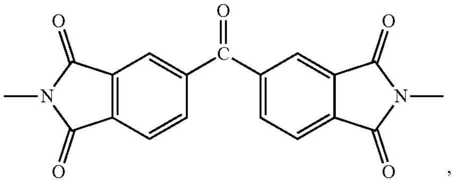

,

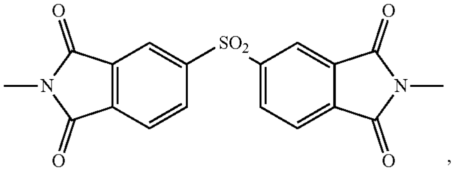

,

-continued

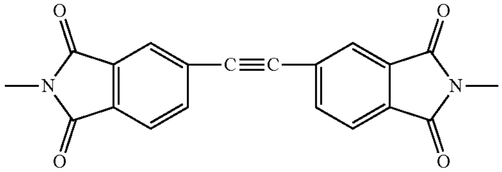

,

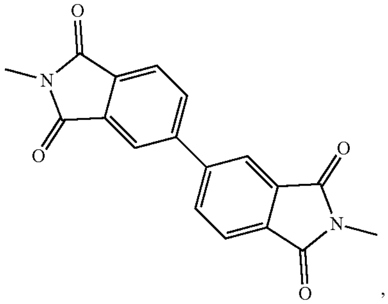

,

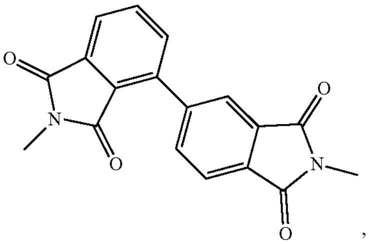

,

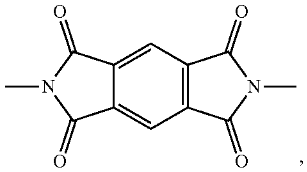

,

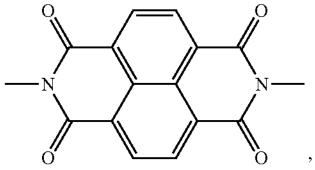

,

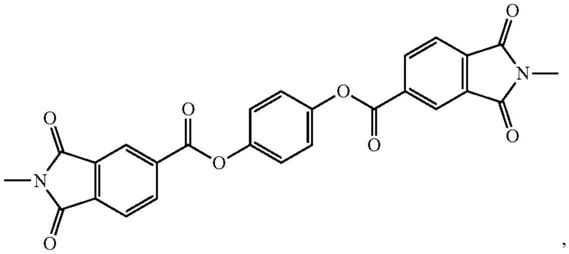

,

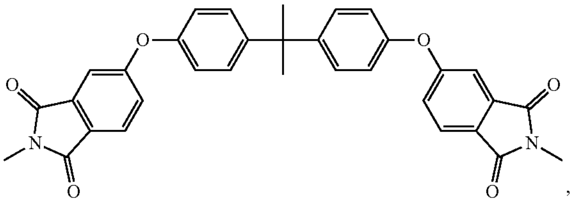

,

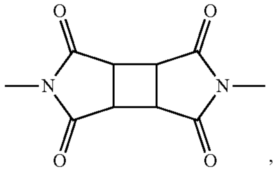

,

-continued

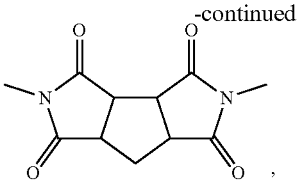

,

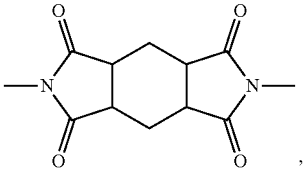

,

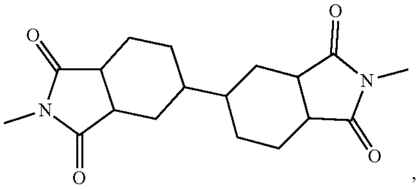

,

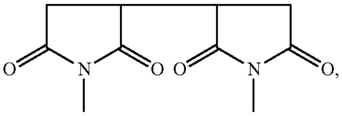

,

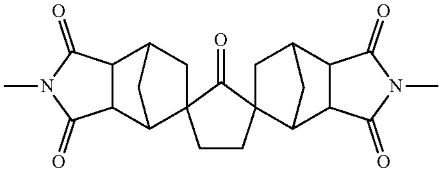

or

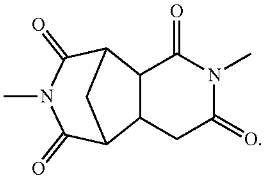

.

9. The polyimide compound according to claim 1, wherein formula (I) is formula (Id):

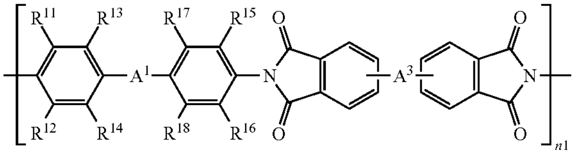

wherein $R^{11}$, $R^{12}$, $R^{13}$, $R^{14}$, $R^{15}$, $R^{16}$, $R^{17}$, and $R^{18}$ are each independently a hydrogen atom, a $C_{1-6}$ alkyl group, a $C_{1-6}$ alkoxy group, or a halogen atom, with a proviso that at least one of $R^{11}$, $R^{12}$, $R^{13}$, and $R^{14}$ is a $C_{1-6}$ alkyl group, a $C_{1-6}$ alkoxy group, or a halogen atom, and with a proviso that at least one of $R^{15}$, $R^{16}$, $R^{17}$, and $R^{18}$ is a $C_{1-6}$ alkyl group, a $C_{1-6}$ alkoxy group, or a halogen atom, $A^1$ is a linear or branched $C_{4-16}$ perfluoroalkylene group, $A^3$ is a single bond or a divalent organic group, and n1 is any integer.

10. A compound represented by formula (II):

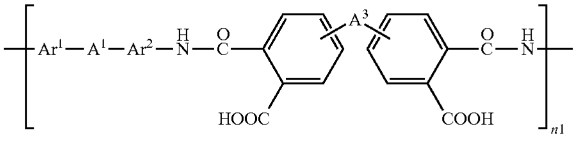

wherein $Ar^1$ is a group represented by the following formula:

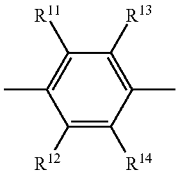

or an indolylene group optionally substituted with one or more substituents, $Ar^2$ is a group represented by the following formula:

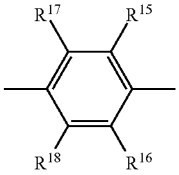

or an indolylene group optionally substituted with one or more substituents, $R^{11}$, $R^{12}$, $R^{15}$, and $R^{16}$ are each independently a $C_{1-6}$ alkyl group, a $C_{1-6}$ alkoxy group, or a halogen atom, $R^{13}$, $R^{14}$, $R^{17}$, and $R^{18}$ are each a hydrogen atom, $A^1$ is a linear or branched $C_{4-16}$ perfluoroalkylene group, $A^3$ is a divalent organic group, and n1 is any integer.

11. A polyimide compound represented by formula (III):

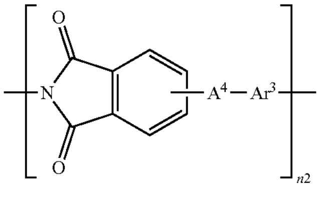

wherein $Ar^3$ is an optionally substituted phenylene group or indolylene group, $A^4$ is a linear or branched $C_{4-16}$ perfluoroalkylene group, and n2 is any integer.

12. The polyimide compound according to claim 11, wherein formula (III) is formula (IIIa):

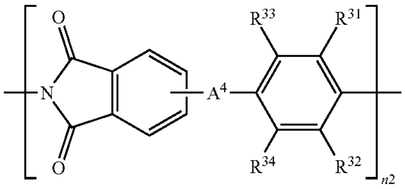

wherein $R^{31}$, $R^{32}$, $R^{33}$, and $R^{34}$ are each independently a hydrogen atom, a $C_{1-6}$ alkyl group, a $C_{1-6}$ alkoxy group, or a halogen atom, $A^4$ is a linear or branched $C_{4-16}$ perfluoroalkylene group, and n2 is any integer.

13. The polyimide compound according to claim 12, wherein $R^{31}$ and $R^{32}$ are each independently a $C_{1-6}$ alkyl group, a $C_{1-6}$ alkoxy group, or a halogen atom, and $R^{33}$ and $R^{34}$ are each a hydrogen atom.

14. The polyimide compound according to claim 12, wherein $R^{31}$ and $R^{32}$ are each a $C_{1-6}$ alkyl group, a $C_{1-6}$ alkoxy group, or a halogen atom, and $R^{33}$ and $R^{34}$ are each a hydrogen atom.

15. The polyimide compound according to claim 1, wherein $R^{11}$, $R^{12}$, $R^{15}$, and $R^{16}$ are each independently a $C_{1-6}$ alkyl group.

16. The polyimide compound according to claim 1, wherein $R^{11}$, $R^{12}$, $R^{15}$, and $R^{16}$ are each independently a $C_{1-6}$ alkoxy group.

17. The polyimide compound according to claim 1, wherein $R^{11}$, $R^{12}$, $R^{15}$, and $R^{16}$ are each independently a halogen atom.

* * * * *